United States Patent [19]

Kramer

[11] Patent Number: 4,982,976
[45] Date of Patent: Jan. 8, 1991

[54] METHOD AND APPARATUS FOR STEERING MULTIPLE AXLE TRAILERS

[75] Inventor: David A. Kramer, Independence, Mo.

[73] Assignee: Trailer Design and Engineering, Inc., North Kansas City, Mo.

[21] Appl. No.: 284,291

[22] Filed: Dec. 14, 1988

[51] Int. Cl.⁵ .............................................. B62D 13/04
[52] U.S. Cl. .................................... 280/426; 280/442
[58] Field of Search ................. 280/426, 419, 442, 443

[56] References Cited

U.S. PATENT DOCUMENTS

| | | | |
|---|---|---|---|
| 1,619,941 | 3/1927 | Kennedy | 280/426 |
| 2,286,166 | 6/1942 | Carmody | 280/426 |
| 2,342,697 | 2/1944 | Runyan | 280/426 |
| 2,433,269 | 12/1947 | Feilabaum | 280/426 |
| 2,925,285 | 2/1960 | Haas | 280/426 |
| 2,959,428 | 11/1960 | Felburn | 280/426 |
| 3,092,398 | 6/1963 | Droeske | 280/426 |
| 3,149,858 | 9/1964 | Gilbert | 280/442 |
| 3,533,644 | 10/1970 | Humes | 280/426 |
| 3,712,641 | 1/1973 | Sherman | 280/426 |
| 3,734,538 | 5/1973 | Humes | 280/426 |
| 4,017,094 | 4/1977 | Pilcher | 280/404 |
| 4,120,509 | 10/1978 | Reeve et al. | 280/81.6 |
| 4,244,596 | 1/1981 | Chung | 280/426 |
| 4,441,730 | 4/1984 | Damm | 280/426 |
| 4,463,966 | 8/1984 | Stoddard | 280/442 |
| 4,468,047 | 8/1984 | McGhie et al. | 280/419 |
| 4,484,758 | 11/1984 | Murray et al. | 280/404 |
| 4,740,006 | 4/1988 | Ducote | 280/426 |

OTHER PUBLICATIONS

Jost Kugel-Lenkkranze, Kugel-Drehlager.
Nicolas Vous Propose . . . Le System Modulaire SGT 14.650.

Primary Examiner—David M. Mitchell
Assistant Examiner—Alan M. Kagen
Attorney, Agent, or Firm—Litman, McMahon & Brown

[57] ABSTRACT

A steering system for use in a towing vehicle-steering trailer assembly, wherein all trailer axles are load-bearing and fixed. The steerable trailer includes a sectored radian steering mechanism which comprises a sectored rack-and-pinion mechanism keyed to the towing vehicle fifth wheel plate. The sectored rack-and-pinion mechanism provides a steering output signal proportional to the relative angle between the towing vehicle and the steerable trailer which approaches an asymptote and thus allows the towing vehicle to turn in relation to the steered trailer without generating the steering mechanism output signal.

9 Claims, 8 Drawing Sheets

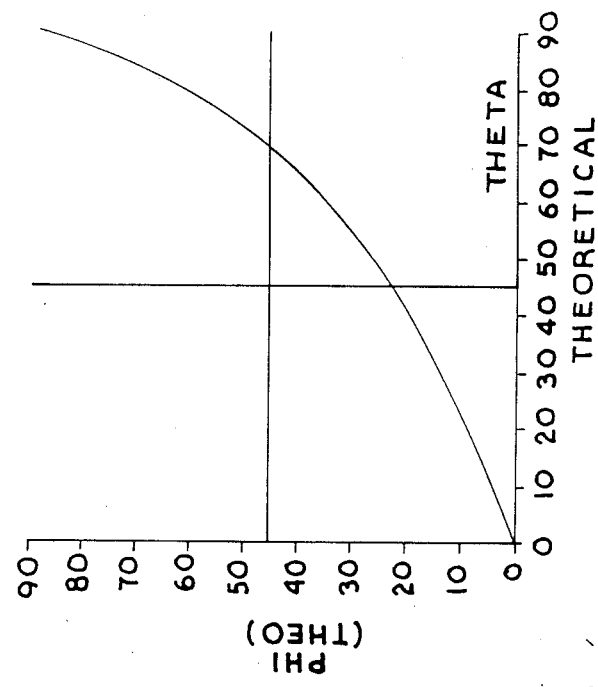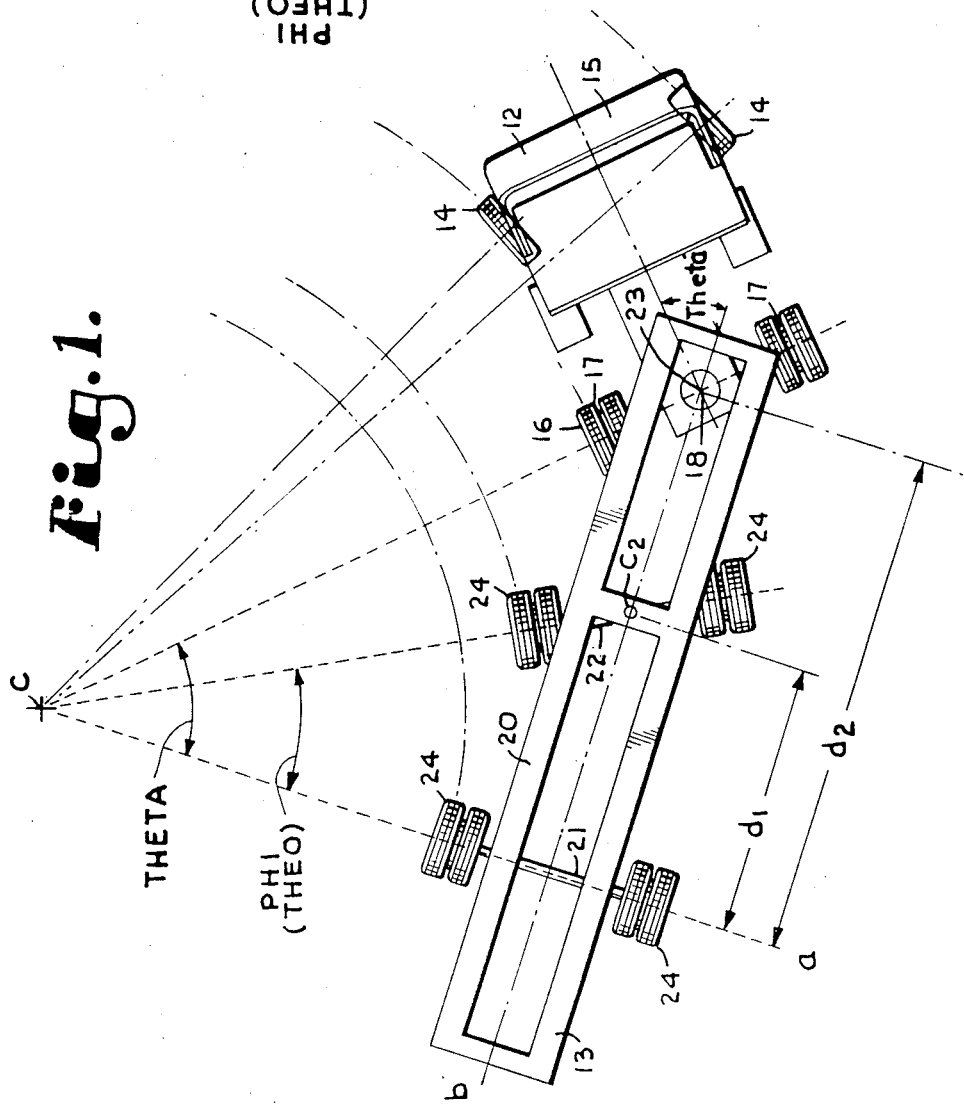

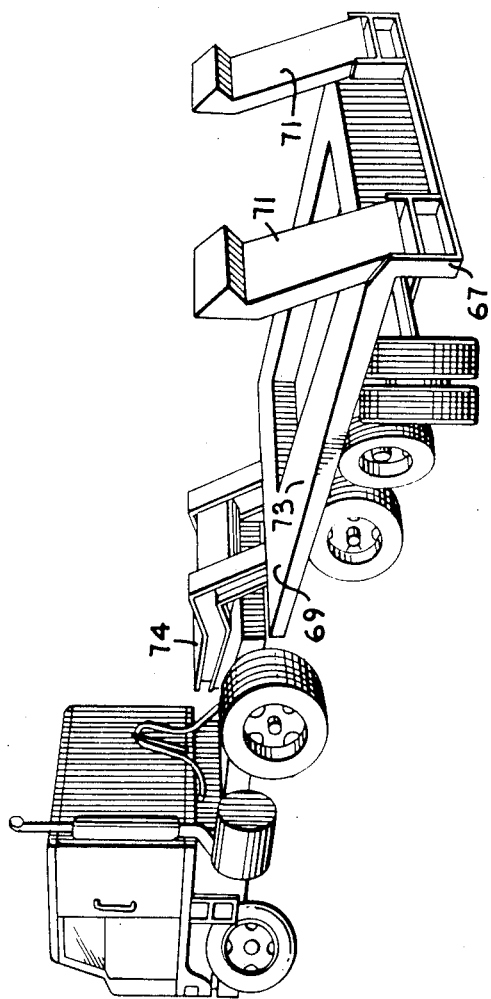
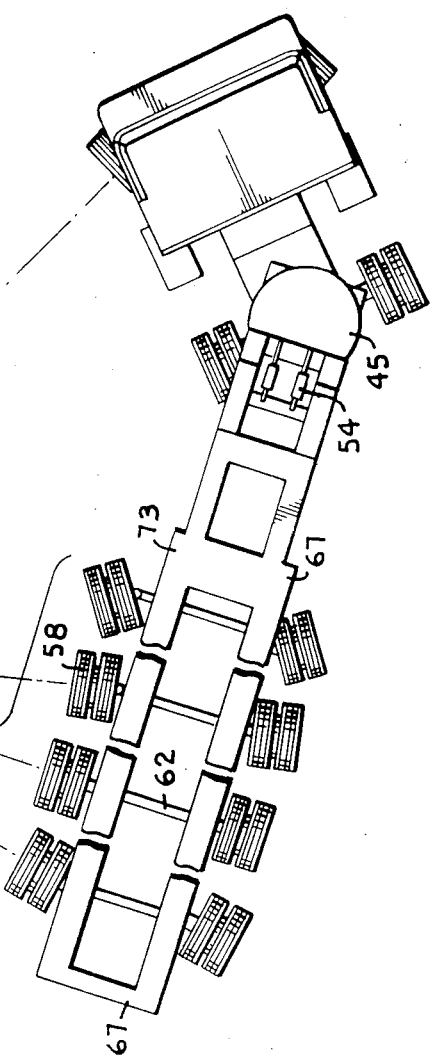

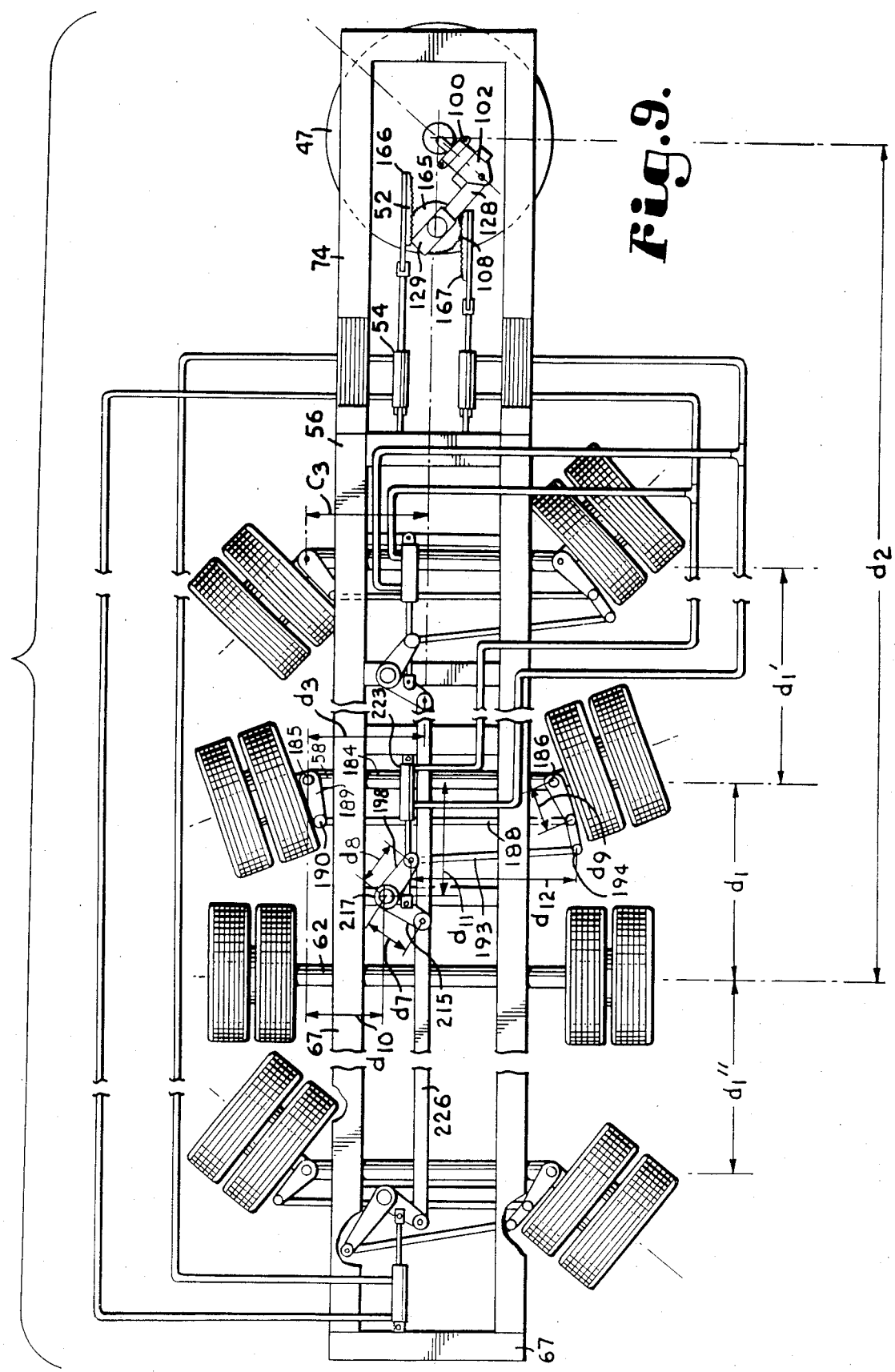

METHOD AND APPARATUS FOR STEERING MULTIPLE AXLE TRAILERS

BACKGROUND OF THE INVENTION

1. Field of the Invention

The present invention relates to a steering mechanism for steerable trailers which are used for transporting long or heavy loads. More particularly, the present invention is directed to a steering mechanism which generates an angle of inclination in steerable wheels of each fixed steerable axle mounted to the steerable trailer. The angle of inclination generated in the fixed steerable axle is in proportion to the relative angle between a towing vehicle and the steerable trailer during the negotiation of a turn.

2. Description of the Prior Art

A conventional towing vehicle used to tow a load-bearing trailer generally includes a "fifth-wheel" mounted to the towing vehicle generally above a set of driving axles of the towing vehicle. The load-bearing trailer is attached to the towing vehicle by mounting a conventional trailer kingpin and a locking dog of the trailer into an approach slot of the towing vehicle fifth wheel. The towing vehicle fifth-wheel allows relative pivotal motion between the towing vehicle and the trailer and the fifth-wheel also provides a load bearing surface on which a forward end of the load-bearing trailer is supported. Load-bearing trailers usually include at least one fixed, non-steerable axle with ground engaging wheels. The fixed, non-steerable axle is mounted to the load-bearing trailer by conventional suspension means. The fixed, non-steerable axle, together with the towing vehicle fifth wheel plate, support the loadbearing trailer. The weight and length of a load carried by the load-bearing trailer generally determines both the required length of the trailer and the number and location of the fixed, non-steerable axle mounted to the trailer.

For a conventional load which is typically light or relatively short, the fixed non-steerable axle can be mounted on the trailer close enough to the fifth wheel of the towing vehicle that the trailer can be safely negotiated through relatively sharp turns by a towing vehicle without encountering problems experienced by trailers used to carry longer or heavier loads. Such problems experienced by a longer trailer, for example, include the tendency of the trailer to roll over inside corners during the negotiation of the trailer through a turn. In addition, other problems arise, as explained below, whenever such trailers are designed for transporting heavy loads, such as military tanks.

For either long or heavy loads, a load bearing trailer requires a greater number of axles to support the trailer than are required for trailers used to haul conventional loads. Thus, as the number of axles increases, both the length and load weight capacity of the trailer may be increased. However, increasing the number of axles on a trailer will also create other problems. If a trailer includes numerous non-steerable axles, the longitudinal axes of which are all aligned in perpendicular relationship to a longitudinal axis of the trailer, the trailer cannot be negotiated through a turn without imposing varying degrees of undesirable stresses on the axles. During the turn, some or all axles may be forced to move or skid in directions including those which are other than parallel to the longitudinal axis of the trailer, thus generating the undesirable stresses. The stresses are undesirable because conventional axles, wheels, and trailer suspension systems supporting such axles are usually designed for only a nominal amount of such skidding stress. Problems usually arise which include excessive wear to the ground engaging tires forced to skid during a turn. Other problems arise because non-steerable axles have a tendency to travel straight forward through a curve and negotiating such a trailer through a curve, especially at higher speeds, may cause severe safety hazards. Yet another problem arising is that the energy demands on a towing vehicle used to tow such a trailer through turns are greater because of energy losses associated with tire skidding as the trailer negotiates a turn. To accommodate higher energy demands, the towing vehicle must have a strong structural design, thus increasing the cost of the towing vehicle.

Steerable trailers have been proposed in the prior art to overcome the problems referenced above. Steerable trailers generally include steerable and non-steerable axles mounted to the trailer. The steerable axles are controlled by various steering mechanisms, a steering output signal from which is proportional to a relative angle between the towing vehicle and the trailer. The steering output signals from the steering mechanisms variously include mechanical, electrical, and hydraulic output signals. The steering mechanism output signals are received by the steerable axles, generating an angle of inclination therein. The angle of inclination for a given output signal will generally vary according to the geometric configuration of the steerable axle, the location of the axle on the steerable trailer, and the relative angle between the towing vehicle and the steerable trailer.

Generally, steerable trailers proposed by the prior art are for use with a trailer design having a frame of a sufficient height to allow full pivotal rotation of all steerable axles ("pivotal steerable axle"), about the axle's mid-point and beneath the trailer. However, such pivotal steerable axles cannot always be used with certain low-to-the-ground trailers. A low-to-the-ground trailer design are often necessary to allow for bridge clearance by loads having considerable height. In addition, pivotal steerable axles structurally adequate to withstand the extreme force imposed on trailer axles during transportation of heavy loads are very costly. A conventional alternative, under these circumstances, is steerable axles which incorporate a fixed, steerable axle design with steerable wheels which may be inclined at outboard ends of the fixed axle. An angle of inclination for the wheels of such a fixed axle design is about a wheel kingpin assembly mounted at each outboard end of the fixed steerable axle. For such a fixed axle design, the axle can be of a sufficient length so that the low-to-the-ground trailer frame does not interfere with the inclination of the wheels about the wheel kingpins.

Problems arise, however, when prior art steering mechanisms are used to steer such fixed, steerable axles because of inherent physical limitations on the extent of inclination which can be achieved in such wheel kingpin assemblies associated with the fixed, steerable axle designs. Prior art steering mechanisms cannot generally be used with fixed steerable axles because, as will be more fully explained below, prior art mechanisms develop a steering output signal for all relative angles developed between the towing vehicle and the steerable trailer during a turn. Conventional fixed, steerable axles are designed so that the angle of inclination generated in the steerable axle by an output signal from a prior art steering mechanism, for a given turning radius, increases as the distance between steerable axle and the fixed non-steerable axle increases. Thus, as a turning radius approaches 90 degrees, the angle of inclination generated in a fixed, steerable axle, sufficiently distant from the fixed, nonsteerable axle, will also approach 90 degrees. However, because of the inherent physical limitations referenced above, the wheels mounted on wheel kingpins of a fixed, steerable axle cannot be inclined to an angle of 90 degrees. While the actual inherent limit on the angle of inclination will vary somewhat, depending on the specific fixed steerable axle design, the limit of inclination will generally be about 45 degrees. Further, although a fixed steerable axle can be designed to receive any output signal from a steering mechanism and never exceed a maximum angle of inclination, such as 45 degrees, to do so would generally be at the expense of steering precision, especially in the lower ranges of turns. Steering precision is most important in the lower ranges principally because the radius of most turns negotiated by a towing vehicle is less than 45 degrees.

Finally, many prior art steering mechanisms generate an output signal which fails to impose an actual angle of incidence in a steerable axle which sufficiently approximates a theoretical angle of incidence in a desired range of relative angles between the towing vehicle and the steerable trailer. The extent of error between the actual angle of incidence generated in the steerable axle and the theoretical angle of incidence in the steerable axle will vary according to the type of steering mechanism chosen, to control the steerable trailer.

The problems arising from the inherent physical limitation of a fixed, steerable axle are more fully illustrated below by reference to a comparison between the theoretical angles of inclination, and actual angles of inclination generated in both pivot steerable axles and fixed steerable axles by prior art steering mechanisms. A comparison of the extent of the error between the actual angle of inclination and the theoretical angle of inclination for a given steerable axle is also presented below for two generalized forms of prior art steering mechanisms.

The theoretical angle of incidence for a particular steering axle is a function of the relative angle between the towing vehicle and the trailer and is also a function of the steering axle geometry and the position of the axle on the trailer. FIG. 1 shows a top plan view of a conventional towing vehicle/steerable trailer assembly. The concept of a theoretical angle of incidence is explained below by reference to a conventional towing vehicle steerable trailer assembly as shown in FIG. 1.

An assembly 10 comprises a towing vehicle 12 and a steerable trailer 13. The towing vehicle 12 comprises front steerable wheels 14, a body 15 and a rear driving axle 16 with rear axle wheels 17. A fifth-wheel 18 is positioned over the rear axle 16 with its central axis positioned at the mid-point of the rear axle 16. The trailer 13 comprises a frame 20 with a fixed non-steerable axle 21, a steerable axle 22 and, a kingpin 23. A pivot point $C_2$ of the steerable axle 22 is a distance, $d_1$, from the fixed nonsteerable axle 21. The fixed non-steerable axle 21 is a distance, $d_2$, from the trailer kingpin 23. Distance, $d_3$, is the lateral distance between the longitudinal axis, b, of trailer 13 and the pivot center $C_2$ of a particular wheel assembly 24 of a steerable axle 22. For a pivot axle such as steerable axle 22, $d_3=0$. Wheel assemblies 24 are rotatably attached by conventional means to each end of each axle. Wheel assemblies 24 comprise conventional dual wheels but it is foreseen that the wheel assembly 24 may comprise a single wheel.

When a towing vehicle 12 towing a steerable trailer 13 negotiates a turn, it does so about an instantaneous turning center, $C_1$, that is a point about which all wheels of the towing vehicle 12 revolve in negotiating a turn of constant radius. If each wheel assembly 24 of the steerable axle 22 of trailer 13 is properly inclined for a turn of constant radius established by the towing vehicle 12, the turning center of each circular path traveled by each wheel assembly 24 will also be at $C_1$. If a center axis of a circular path traveled by a wheel assembly 24 does not focus on the turning center, $C_1$, the wheel assembly 24 will be misaligned for the particular turning radius. During the turn, the misaligned wheel assemblies 24 will thus undergo skidding and scuffing and the associated axle will be exposed to undue stresses. There is a theoretical angle of incidence, $Phi_{(theo)}$, for each wheel assembly 24 of each steerable axle 22 which, if adopted by the wheel assembly 24, will align the center axis of the path traveled by the wheel assembly 24 on turning center, $C_1$, and will avoid the imposition of scuffing and of undue stresses.

The theoretical angle, $Phi_{(theo)}$, of a steerable axle 22 located between the kingpin 23 and the fixed axle 21 can be calculated and is a function of distances $d_1$, $d_2$, $d_3$ and a relative angle, Theta, between the towing vehicle 12 and the trailer 13. To calculate $Phi_{(theo)}$, the following assumptions are made: (1) the longitudinal axis, a, of the fixed axle 21 is at right angles to the longitudinal axis, b, of the trailer 13; and (2) when the towing vehicle 12 has established a constant turning radius, the longitudinal axis, a, of the fixed axle 21 will, if extended, intersect $C_1$.

For such conditions, $Phi_{(Theo)}$ is mathematically expressed as follows:

$$Phi_{(theo)} = \tan^{-1}\left[\frac{d_1}{\left[\frac{d_2}{\tan(Theta)}\right] - d_3}\right]$$

where $Phi_{(theo)}$ = theoretical angle for a given wheel assembly 24 of a steerable axle 22

$d_1$ = distance between fixed axle 21 and a steerable axle 22 pivot point, $C_2$ $d_2$ = distance between trailer 13, kingpin 23 and fixed axle 21

$d_3$ = lateral distance between the longitudinal axis, b, of trailer 13 and the pivot center, $C_2$, of a particular wheel assembly 24 of a steerable axle 22 ($d_3=0$ in this example).

Theta = angle between towing vehicle 12 and trailer 13

Note that $d_1$, $d_2$, and $d_3$ are mathematical constants for each wheel assembly 24 of each steerable axle 22.

A plot of the angle Phi(theo) for the steerable axle corresponding to each angle Theta between 0 and 90 degrees is presented in FIG. 2. The values corresponding to the plot in FIG. 2 are presented below in Table 1.

TABLE 1

Phi$_{(theo)}$ for given Theta
($d_1 = 15$, $d_2 - 26.5$, $d_3 = 0$)
(Angles are in Degrees)

| THETA | PHI$_{(theo)}$ |
|---|---|
| 0 | 0 |
| 5 | 3 |
| 10 | 6 |
| 15 | 9 |
| 20 | 12 |
| 25 | 15 |
| 30 | 18 |
| 35 | 22 |
| 40 | 25 |
| 45 | 30 |
| 50 | 34 |
| 55 | 39 |
| 60 | 44 |
| 65 | 51 |
| 70 | 57 |
| 75 | 65 |
| 80 | 73 |
| 85 | 81 |
| 90 | 90 |

Note that when Theta is 0 degrees and 90 degrees, Phi$_{(theo)}$ is also 0 degrees and 90 degrees, respectively. However, in the range of Theta between 0 to 90 degrees, Phi$_{(theo)}$ is non-linear.

Various turning mechanisms have been proposed for transforming the relative angle between the towing vehicle 12 and trailer 13, into a steering mechanism output signal which inclines the wheel assemblies 24 of the steerable axles 22, which are pivot axles. The two most prevelant prior art steering mechanisms are discussed and, for convenience, are classified in two categories, herein named after the mathematical relationship describing their behavior.

Many prior art steerable trailers incorporate the pivot axle with a steering mechanism, the output from which is related to the sine of the angle Theta between the towing vehicle and the steerable trailer. Such steering mechanisms are hereinafter referred to as "sine steering mechanisms". FIG. 3 shows a top plan view of the conventional towing vehicle/steerable trailer assembly of FIG. 1 with a "sine steering mechanism" used in conjunction with a pivot axle. Referring to FIG. 3, an example of a sine turning mechanism 25 for a pivot axle is one which comprises a form of a forward turning arm 27, a pair of motion transfer rods 28, and a rear turning arm 29, all pivotally attached in a general form of a parallelogram.

The forward turning arm 27 is pivotally attached to the trailer frame 20 at a forwardmost position of frame 20 with the forward turning arm 27 centered in spaced relation above the kingpin 23. The kingpin 23 extends downwardly into the pivot point of the fifth wheel 18. The forward turning arm 27 is releasably attached to the fifth-wheel 18 in such a way as to maintain a longitudinal axis, e, of the forward turning arms 27 in vertical alignment with the longitudinal axis, f, of the rear axle 16 of the towing vehicle 12 as the towing vehicle 12 moves into angular relationship with the trailer 13 during the negotiation of a turn.

As an angle Theta is developed between the towing vehicle 12 and the trailer 13, a steering mechanism 25 output signal is generated as the forward turning arm 27 is rotated by the towing vehicle 12, relative to the trailer 13. The rotational motion of the forward turning arm 27 is transmitted to linear motion in the motion transfer rods 28. The linear motion of the transfer rods 28 is transmitted to rotational motion in the rear turning arm 29 which is pivotally attached to the trailer 13 and fixedly attached to the steerable axle 22.

The relationship between an angle Phi(sin) in the steerable axle 22 imposed by the sine steering mechanism 25, and Theta is expressed below:

$$Phi_{(sin)} = \sin^{-1} \frac{\sin(Theta)\, l_1}{l_2}$$

Where:
$l_1$ = one-half of longitudinal length of turning arm 27
$l_2$ = one-half of longitudinal length of turning arm 29

FIG. 4 shows a plot of the values of Phi$_{(sin)}$ and Phi$_{(theo)}$ for steerable axle 22 corresponding to each value of Theta between 0 and 90 degrees.

The value of Phi$_{(sin)}$, Phi$_{(theo)}$, and Theta corresponding to the plot of FIG. 4 are presented in Table 2.

TABLE 2

SINE STEERING MECHANISM
($d_1 = 15$, $d_2 = 26.5$, $d_3 = 0$, $l_1 = 12$, $l_2 = 17.25$)

| THETA | PHI$_{(theo)}$ | PHI$_{(sin)}$ | ERROR PHI |
|---|---|---|---|
| 0 | 0 | 0 | 0 |
| 5 | 3 | 3 | −1 |
| 10 | 6 | 7 | −1 |
| 15 | 9 | 10 | −2 |
| 20 | 12 | 14 | −2 |
| 25 | 15 | 17 | −2 |
| 30 | 18 | 20 | −2 |
| 35 | 22 | 24 | −2 |
| 40 | 25 | 27 | −1 |
| 45 | 30 | 29 | 0 |
| 50 | 34 | 32 | 2 |
| 55 | 39 | 35 | 4 |
| 60 | 44 | 37 | 7 |
| 65 | 51 | 39 | 11 |
| 70 | 57 | 41 | 16 |
| 75 | 65 | 42 | 22 |
| 80 | 73 | 43 | 29 |
| 85 | 81 | 44 | 37 |
| 90 | 90 | 44 | 46 |

The values of $l_1$ and $l_2$ were chosen in this example such that: Phi$_{(sin)}$=Phi$_{(theo)}$ at Theta=45 degrees. For such values of $l_1$ and $l_2$, the sine steering mechanism 25 generates an error which is generally constant for Theta between 0 and 45 degrees. However, at angles of Theta beyond 45 degrees the error begins to grow and achieves a maximum at Theta of 90 degrees.

As previously discussed, a problem arises in using a sine steering mechanism 45 with a pivot axle when the particular load requires that a trailer load carrying surface be low to the ground. For such trailer designs, a trailer frame may prohibit inclination of the pivot steerable 22 axle beneath the frame. Thus, for such low-to-the-ground trailer designs, pivot axles generally cannot be used with a conventional trailer frame 20, such as that disclosed in FIG. 3. Further, inclination in any steerable wheels can generally occur only at the outboard ends of a steerable axle thus requiring some form of fixed-steerable axle. Wheels for such fixed-steerable axles are mounted on kingpins at each end of the axle. But the use of wheel kingpin designs will impose a limit on the extent to which the steerable wheel may be inclined. Conventional kingpin wheel designs cannot be inclined beyond about 45 degrees. As such, sine steering mechanisms cannot generally be used with steerable trailers having multiple fixed steerable axles located at various distances from the fixed nonsteerable axle because, as Theta approaches 90 degrees, Phi$_{(sin)}$ may exceed 45 degrees for a fixed-steerable axle positioned sufficiently distant from the fixed non-steerable axle.

The Felborn '428 patent discloses a trailer steering mechanism which is an example of a sine steering mechanism. The steering mechanism comprises a plate member 80 fixedly mounted to a kingpin 66 which is caused to rotate with the towing vehicle's fifth wheel. Steering rods 140 and 142 are pivotally attached at a first end to the rear margin of the plate 80. The second ends of the rods 140 and 142 are pivotally attached to an axle 46 which is a steerable pivot axle which can be made to rotate about a pivot point corresponding to kingpin 42. Further, the axle 46 is in spaced relation beneath the frame member 10 of the trailer to allow sufficient clearance between steerable wheels 16 and the trailer frame members 10 when the steerable axle 46 is rotated. As can be noted from FIG. 2 of the '428 Felborn patent, not only does such a sine mechanism require clearance beneath a trailer for the rotation of the steerable pivot axle, sufficient clearance must be provided also for lateral movement of the steering rods 142 and 143 beneath a trailer.

Another steering system proposed in the prior art for steerable trailers is a "radian steering mechanism" for pivot axles. FIG. 5 shows an example of a radian steering mechanism 40 in place of the sine turning mechanism 25 in the conventional towing vehicle/steerable trailer shown in FIG. 3. As shown in FIG. 5, a form of a radian turning system 40 comprises a forward turning gear 41 with a radius $r_4$, a rear turning gear 42 with a radius $r_5$ and a chain 43. The forward turning gear 41 is pivotally mounted to the forward end of the towing vehicle 12 with a central axis aligning with the longitudinal axis of the kingpin 23. An output signal is generated in the radian steering mechanism 25 when rotational movement of the towing vehicle 12 in relationship to the steerable trailer 13 causes rotational movement of the forward turning gear 41. The central axis of the rear turning gear 42 is positioned centrally and in spaced relation above the steerable axle 22. The chain 43 of endless configuration connects the forward turning gear 41 to the rear turning gear 42. Rotational motion of the forward gear 41 is transmitted to linear motion in the chain 43. The linear motion in chain 43 causes rotational motion in the rear turning gear 42.

An angle $Phi_{(rad)}$ imposed by the radian steering mechanism 40 in the steerable axle 22 as a function of Theta is expressed below:

$$Phi_{(rad)} = \frac{r_4 \, Theta(\text{radians})}{r_5}$$

Where:
$r_4$ = radius of forward turning gear 41
$r_5$ = radius of rear turning of gear 42
Theta = angle between towing vehicle 12 and trailer 13 in radians.

FIG. 6 shows a plot of the $Phi_{(rad)}$ angle imposed by radian steering mechanism 40 for the angles of Theta in the range 0 to 90 degrees.

The values of Theta, $Phi_{(theo)}$, $Phi_{(rad)}$ which correspond to the plot of FIG. 6 are presented in Table 3.

TABLE 3

RADIAN MECHANISM
($d_1$ = 15, $d_2$ = 26.5, $d_3$ = 0, $r_4$ = 12, $r_5$ = 18)
(ANGLES ARE IN DEGREES)

| THETA | PHI$_{(theo)}$ | PHI$_{(rad)}$ | ERROR |
|---|---|---|---|
| 0 | 0 | 0 | 0 |
| 5 | 3 | 3 | 0 |
| 10 | 6 | 7 | −1 |
| 15 | 9 | 10 | −1 |
| 20 | 12 | 13 | −2 |
| 25 | 15 | 17 | −2 |
| 30 | 15 | 20 | −2 |
| 35 | 22 | 23 | −2 |
| 40 | 25 | 27 | −1 |
| 45 | 30 | 30 | 0 |
| 50 | 34 | 33 | 1 |
| 55 | 39 | 37 | 2 |
| 60 | 44 | 40 | 4 |
| 65 | 51 | 43 | 7 |
| 70 | 57 | 47 | 11 |
| 75 | 65 | 50 | 15 |
| 80 | 73 | 53 | 19 |
| 85 | 81 | 57 | 25 |
| 90 | 90 | 60 | 30 |

As with the sine steering mechanism 25, use of a radian steering mechanism 40 with a steerable axle 22 in the form of a pivot axle requires that the trailer frame 13 be of sufficient height to allow the rotation of the steerable axle 22 therebeneath. Thus, a radian steering mechanism cannot generally be used with a pivot axle on low-to-the ground trailers. Further, as previously discussed, a fixed steerable axle design cannot be used with a radian steering mechanism because such axles are physically limited to a range of inclination, typically, less than 45 degrees. A radian steering mechanism will attempt to generate angles of $Phi_{(rad)}$ greater than 45 degrees for angles of Theta between 0 and 90 degrees. Thus, the radian steering mechanism 40 cannot be used with a fixed steerable axle without a means to limit its output.

Further, radian steering mechanisms incorporating cables or chains suffer the disadvantages associated with stretching or wear, which result in worsening any imprecision of the steering mechanism. Finally, the radian steering mechanisms cannot be used without a major modification because the radian steering mechanism will be mounted to the gooseneck portions which is a different height than the steerable axle.

An example of a radian steering system with a pivot axle is disclosed in the Chung '596 patent. The '596 patent discloses a steering apparatus with a steering transmission plate 3 rotatably attached to the forward end of the trailer and a rear steering transmitting plate 11 rotatably attached to the trailer and located at the rear end of the trailer. The central axis of the forward plate 3 aligns with the central axis of the fifth wheel 1 and is keyed to the fifth wheel 1 when the trailer is attached to the towing vehicle. The plates are joined together by a cable arrangement wherein rotation of the front steering plate 3 causes a corresponding rotation in the rear steering plate 11. Note that because the cable 15 is crossed, the rotation of steering plate 11 will be in an opposite direction to that of steering plate 3. The pivot axle in the '596 patent comprises a pair of axles mounted to a rotary plate 11. The plate 11 is pivotally attached to the trailer.

Referring to FIGS. 4 and 6, note that the plot for $Phi_{(sin)}$ and $Phi_{(rad)}$ cross the plot for $Phi_{(Theo)}$ at points where Theta=45 degrees, respectively (hereinafter "crossover points"). The crossover point may be varied according to the design needs of the trailer. However, if the crossover point is established at a sufficiently low value of Theta to avoid Phi exceeding 45 degrees (as is necessary when fixed-steerable axles are used) when Theta nears 90 degrees the error between $Phi_{(theo)}$ and the angle Phi imposed by the steering mechanism may become excessive and unacceptable. If the crossover point is established at sufficiently high values of Theta to avoid excessive error between $Phi_{(theo)}$ and the angle Phi imposed by the steering mechanism for lower values of Theta, then at some value of Theta, the Phi imposed by the steering mechanism will exceed 45 degrees, a condition which is equally unacceptable in fixed steerable axles.

The U.S. Pat. No. 4,740,006 to Ducote discloses a device which is neither a sine nor a radian steering mechanism but is rather a steering mechanism which uses a microprocessor to generate a steering mechanism output signal. The devices disclosed in the '006 patent can theoretically be used to limit wheel angle of inclinations to 45 degrees and may also be used to approximate the theoretical angle $Phi_{(theo)}$. The '006 patent discloses a steering mechanism which incorporates a microprocessor, which based on an input from a sensor measuring the angle Theta, signals a servo mechanism to electrically drive a gear box which imposes an angle of inclination in the wheels of the fixed steerable axle. However, such electrical components are not reliable, especially in military applications where externally generated electromagnetic radiation may create undesirable electrical signals in electrical conductors, including those comprising the servo mechanisms, of the '006 steering mechanism, generating erroneous steering signals. Further, such servo mechanisms may not withstand other effects of torturous environments typically present in military applications. Finally, such designs require alternative sources of energy to incline the steerable axles. The alternative sources may be separate electrical generators to power the servo mechanisms. Also, such designs would require an electrical connection between the towing vehicle and the trailer making the design less reliable and also creates lag problems. If hydraulics are used to incline the steerable axles, then a separate source of hydraulic supply is required, which further reduces reliability and increases cost.

Therefore, the devices disclosed in the prior art as previously discussed, and also other devices which combine the effects of the sine steering mechanism and the radian steering mechanism cannot be used without suffering the disadvantage cited above.

SUMMARY OF THE INVENTION

A steering mechanism for a steerable trailer having fixed steerable axles mounted to a low lying frame is provided which transfers the direction of motion of towing vehicle to the fixed steerable axles of the steerable trailer. The steerable trailer comprises one or more fixed steerable axles having wheels pivotally connected by wheel kingpins to outboard ends of fixed axles for safe and economic towing of the trailer. Each fixed steerable axle is controlled by conventional articulated steering linkage comprising a stay rod, a tie rod, and a steering arm. Each steerable wheel associated with each fixed steerable axle is linked by a stay rod. The turning motion is imposed in the stay rod by a tie rod linked to steering arms. The wheels of the steerable axle are inclined by hydraulic operators of a hydraulic actuation system linked through a bell crank to the tie rods. The hydraulic operators are activated by the steering mechanism.

The steering mechanism comprises a roller bearing slew ring and upper fifth wheel plate centrally mounted on a lower surface of a forward and gooseneck portion of a trailer. A trailer kingpin is mounted on the lower surface of the upper fifth wheel plate for mounting in a fifth wheel of the towing vehicle. Mounted eccentrically on the lower surface of the upper fifth wheel plate is a locking dog which mounts into an approach slot of the towing vehicle fifth wheel. The sector arm, at its first end, is attached to the upper surface of the fifth wheel plate by a pivoted connector. Eccentrically mounted to an upper surface of the upper fifth wheel plate and between the frame members of the gooseneck is a steering sector arm which is slidably received at a second end in a sleeve member fixedly attached to a pinion gear of a rack-and-pinion mechanism rotatably mounted between the frame members of the gooseneck portion of the trailer. The pivoted connector can be adjusted such that the maximum angle of inclination in the steerable wheels is a desired value, such as 45 degrees. A pair of rack gears of the rack-and-pinion mechanism are pivotally attached to hydraulic actuation cylinders of a hydraulic actuation system.

The roller bearing slew ring and upper fifth wheel plate allows the upper fifth wheel plate to rotate with the towing vehicle fifth wheel plate during the negotiation of a turn. When the trailer is negotiated through a sharp turn, the rotation of the upper fifth wheel plate of the trailer is transmitted to rotation of the pinion gear of the rack-and-pinion system until such time as the longitudinal axis of the sector arm is tangent to the circular path of travel described by a pivoted connector.

OBJECTS OF THE INVENTION

The principal objects of the present invention are: to provide an improved active steering mechanism for steerable trailers to facilitate the inclination of fixed steerable axles of a trailer during the negotiation of a turn; to provide a mechanism having a rack-and-pinion gear apparatus to transmit a motion generated by relative motion between a towing vehicle and the trailer to the fixed steerable axles; to provide such a mechanism which may be used in conjunction with fixed steerable axles incorporating wheels pivotally mounted by kingpins to fixed axles; to provide such a steering mechanism which minimizes the tire scuffing caused when the trailer negotiates a sharp turn; to provide such a steering mechanism which limits the inclination of the steerable fixed axles during the negotiation of a turn to prevent damage to the articulated steering linkage of a fixed-steerable trailer; to provide a steering mechanism which can withstand the tortures of military application; to provide a steering mechanism which incorporates the use of hydraulic actuation cylinders for the purpose of motion transmission; and to provide such a steering mechanism which is relatively easy to manufacture, relatively inexpensive to produce, and is particularly well-adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a top plan view of a towing vehicle/steerable trailer assembly including a first pivotal steerable axle and a second fixed non-steerable axle.

FIG. 2 is a plot of a theoretical angle $Phi_{(theo)}$ for each angle Theta between 0 and 90 degrees for a pivot axle with dimensions $d_1$, $d_2$, and $d_3$.

FIG. 7 is a perspective view of a towing vehicle/steerable trailer assembly as it may be viewed negotiating a turn.

FIG. 8 is a top plan view of a towing vehicle/steerable trailer assembly with a sectored radian steering mechanism of the present invention.

FIG. 9 is a top plan view similar to that shown in FIG. 8 showing an enlarged fragmentary view of a trailer frame with a sectored radian steering mechanism of the present invention.

DETAILED DESCRIPTION OF THE INVENTION

Figure 4:
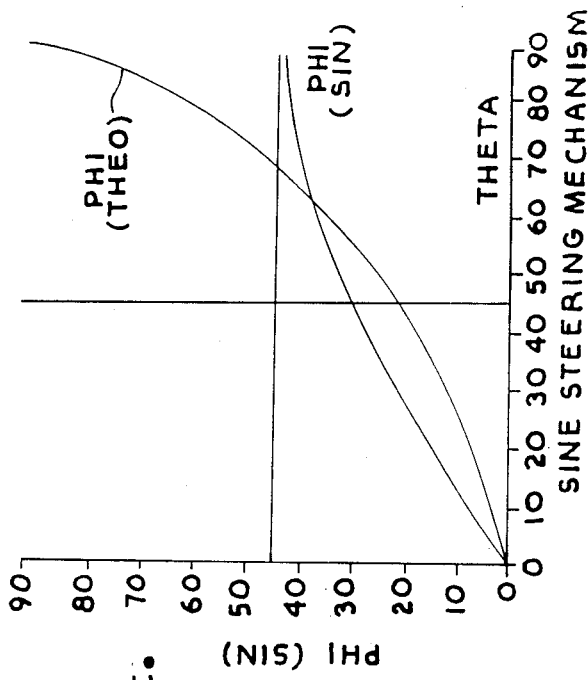
FIG. 4 is a plot of a theoretical angle $Phi_{(theo)}$ and an angle $Phi_{(sin)}$ generated by a sine steering mechanism in a pivot axle with dimensions $d_1$, $d_2$, and $d_3$, for each angle Theta between 0 and 90 degrees.
Figure 3:
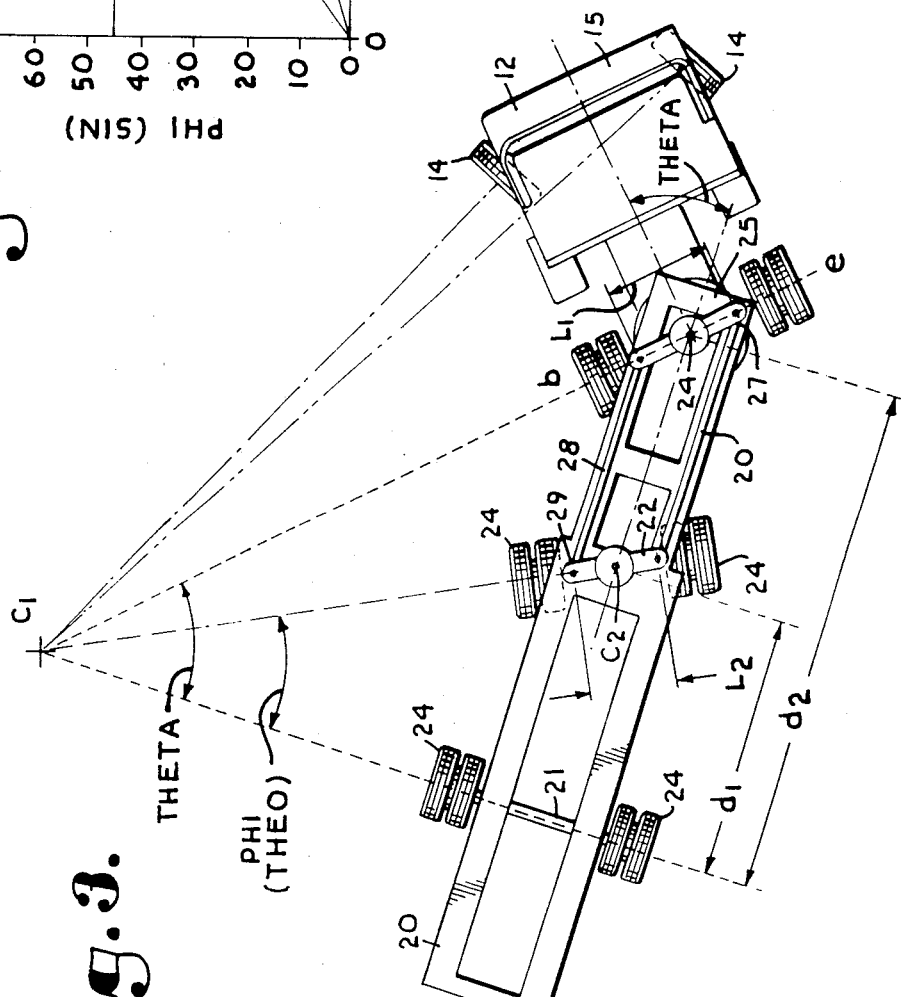
FIG. 3 is a top plan view of a towing vehicle/steerable trailer assembly as shown in FIG. 1 showing a sine steering mechanism controlling a pivotal steerable axle.
Figure 6:
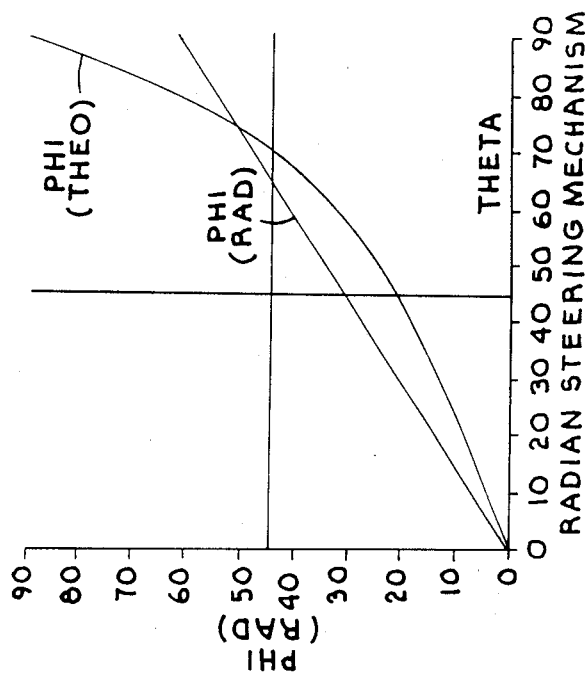
FIG. 6 is a plot of a theoretical angle $Phi_{(theo)}$ and an angle $Phi_{(rad)}$ generated by a radian steering mechanism in a pivot axle with dimensions $d_1$, $d_2$, and $d_3$ for each angle Theta between 0 and 90 degrees.
Figure 5:
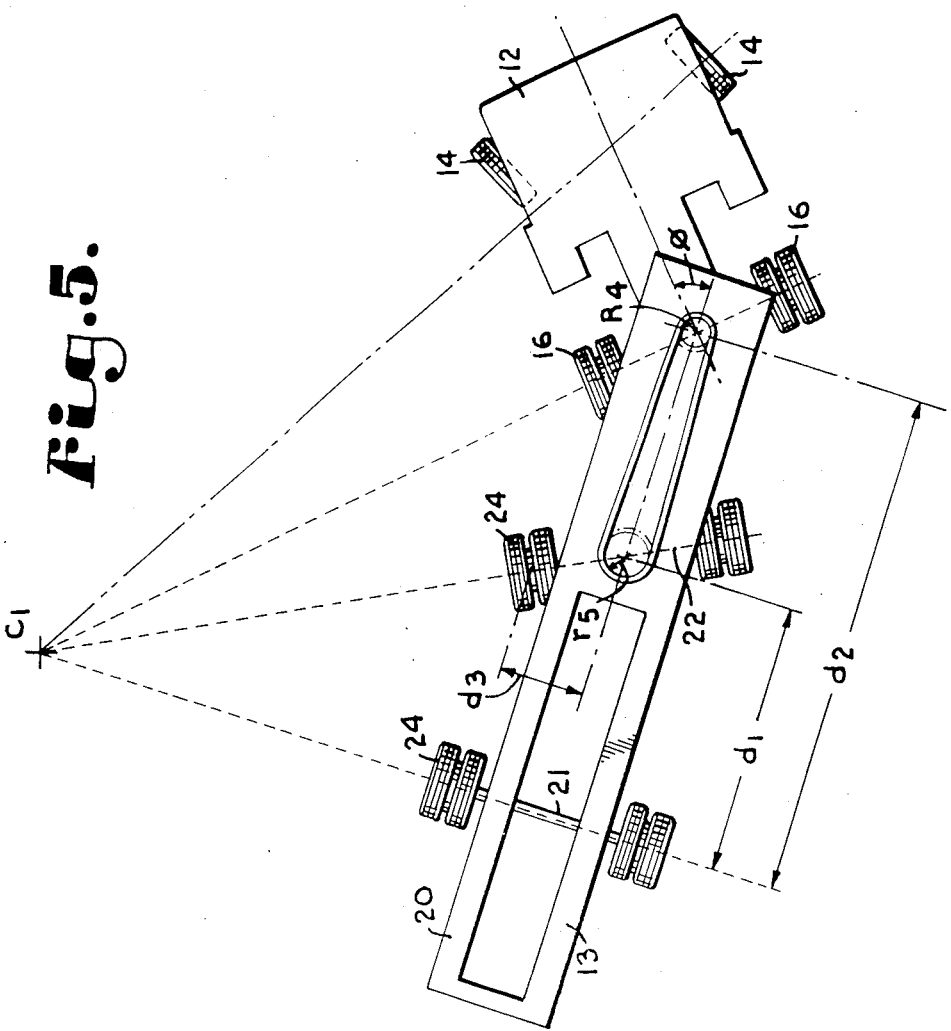
FIG. 5 is a top plan view of a towing vehicle/steerable trailer assembly as shown in FIG. 3 having a radian steering mechanism in place of the sine steering mechanism.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIG. 9, the numeral 45 generally designates a sectored radian steering mechanism of the present invention. The sectored radian steering mechanism 45 generally includes a rotational motion detection means for generating a rotational output signal, which in the present embodiment, is in the form of a roller bearing slew ring assembly 47 and upper fifth wheel plate assembly 49, a motion transformation means for transforming said rotational output signal into a linear motion output signal, which in the present embodiment is in the form of a sectored rack-and-pinion assembly 52, a linear motion transfer means, which in the present embodiment is a hydraulic actuation system 54, a trailer frame assembly 56, fixed steerable axle assemblies 58, steering actuation linkage means assembly 60 and a fixed non-steerable axle assembly 62.

The trailer frame assembly 56 comprises a conventional trailer having a frame 67, a load surface 69, and loading racks 71. Frame 67 comprises a load support portion 73 and a gooseneck portion 74. The gooseneck portion 74, the load support portion 73, the load surface 69, and the loading racks 71 are all of conventional design and are all interconnected by conventional means.

Figure 12:
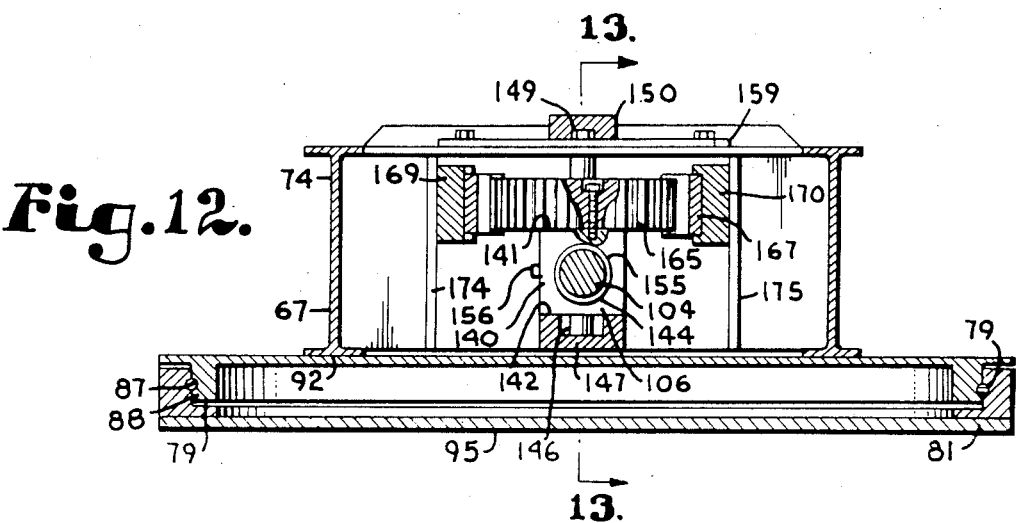
FIG. 12 is an enlarged, sectional view of the sectored radian steering mechanism taken along the line 12—12 of FIG. 11.

The roller bearing slew ring assembly 47 comprises an upper ring member 76, a lower ring member 77, a plurality of ball bearings 79, an upper fifth wheel plate 81, a trailer kingpin 83 and a locking dog 85. The upper ring member 76 nests into the lower ring member 77 as illustrated in FIG. 12. A bearing race surface 87 is positioned at the vertical interface 88 of the upper ring member 76 and lower ring member 77. The bearing race surface 87 is of a sufficient inner diameter to receive the plurality of ball bearings 79. The central axis of the bearing race surface 87 has a diameter of about three feet. However, it is foreseen that the diameter of the bearing race surface 87, the roller bearing slew ring assembly 47, and the upper fifth wheel plate assembly 49 may vary according to the specific trailer design requirements.

Figure 13:
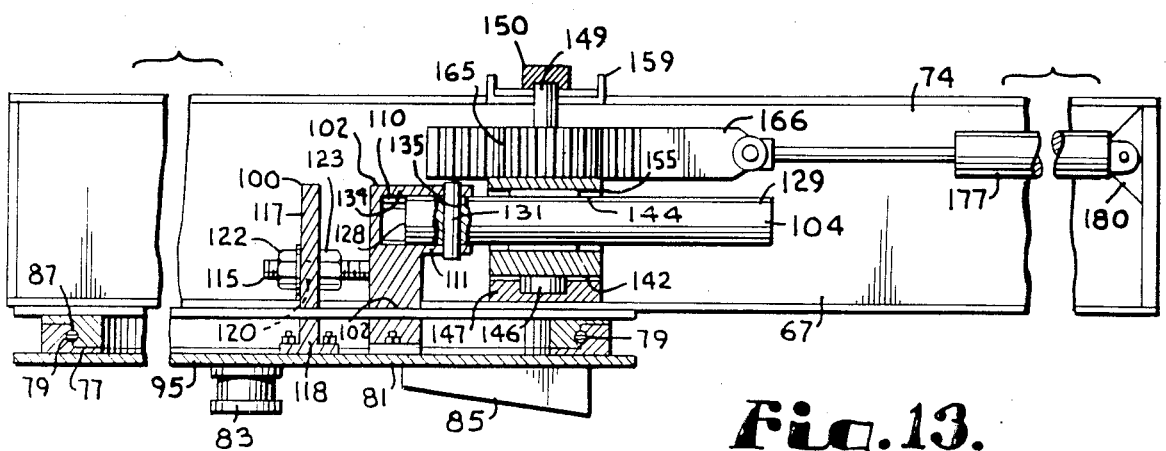
FIG. 13 is a side, enlarged sectional view of the sectored radian steering mechanism substantially on line 13—13 of FIG. 12 showing a sector arm slidably received by a sector box of a rack-and-pinion apparatus.

The upper fifth wheel plate assembly 49 comprises an upper fifth wheel plate 81, a kingpin 83 and a locking dog 85. The upper fifth wheel plate 81 is constructed of halfinch high carbon alloy steel and has a diameter of about three and one-half feet. The upper fifth wheel plate 81 is centrally positioned beneath the roller bearing slew ring assembly 47 with its central axis aligning with that of the slew ring assembly 47. The upper fifth wheel plate 81 is fixedly attached by conventional methods to the slew ring assembly 47, as shown in FIG. 12. The slew ring assembly 47 is centrally positioned on a lower surface 92 of the gooseneck portion 74 of the frame 67. The kingpin 83 and the locking dog 85 are fixedly attached to the lower surface 95 of the upper fifth wheel plate 91, as shown in FIG. 13. The central axis of the kingpin 83 aligns with the central axis of the upper fifth wheel plate 81.

The rack-and-pinion assembly 52 comprises a first member, which in the present embodiment is an adjustment assembly 100, and a second member, which in the present embodiment is a yoke assembly 102, a sector shaft 104, a sector sleeve assembly 106, and a rack-and-pinion 108 having a first and second end. The first end of the second member comprises the yoke assembly 102. The send end of the second member comprises the sector shaft 104, the sector sleeve assembly 106, and the rack-and-pinion 108. The yoke assembly 102 has the general shape of an "F", as shown in FIG. 13. The yoke assembly comprises an upper yoke member 110, a lower yoke member 111, and a support member 112. The yoke assembly 102 is fixedly attached by conventional bolting methods to the upper surface 91 of the upper fifth wheel plate 81 at a position eccentric to the central axis of the upper fifth wheel plate 81. A plane defining a forward vertical surface 114 of the yoke assembly 102 is centered on and is perpendicular to a radius extending from the center of the upper fifth wheel plate 81. In such a position, the upper member 110 and the lower member 110 project outward from the center of the upper fifth wheel plate 81. Positioned centrally on the forward vertical surface 114 of the yoke assembly 102 and projecting normally from the forward vertical surface 114 toward the center of the fifth wheel plate 81 is an adjustment bolt 115.

The adjustment assembly 100 comprises an adjustment plate 117 having at its lower end a mounting bracket 118. The adjustment assembly 100 is mounted to the fifth wheel plate 81 at a position between the upper fifth wheel plate 81 center axis, $C_4$, and the yoke assembly 102 with the adjustment plate 117 lying parallel to the front surface 114 of the yoke assembly 102. The adjustment bolts 115 slidably pass through openings 120 centrally positioned in the adjustment plate 117. Nuts 122 and 123 are threaded onto the adjustment bolt 115 and when rotated on the adjustment bolt 115 operate to alter the distance between the yoke assembly 102 front vertical surface 114 and the center, $C_4$, of the upper fifth wheel plate 81.

The sector shaft 104 is a cylindrical solid shaft having a length of about two feet and a diameter of about three inches. The shaft 104 has a first end 128 and a second end 129. The first end 128 is slidably received by and pivotally attached to the yoke assembly 102 between the upper yoke member 110 and the lower yoke member 111. The sector shaft 104 is pivotally attached to the yoke assembly 102 by a pivot pin 131 which passes through openings 134, 135 and 136 in the upper yoke member 110, the first end 128 of the sector shaft 104, and the lower yoke member 111, respectively. The central axes of the openings 134, 135 and 136 are all in alignment. The openings 134, 135 and 136 are of such a diameter that pivot pin 131 is tightly received by opening 134 and 136 and pivotally received by 135. The sector shaft 104 can thus be pivoted in a horizontal plane about the central axis of the pivot pin 131 once mounted in the yoke assembly 102.

Figure 14:
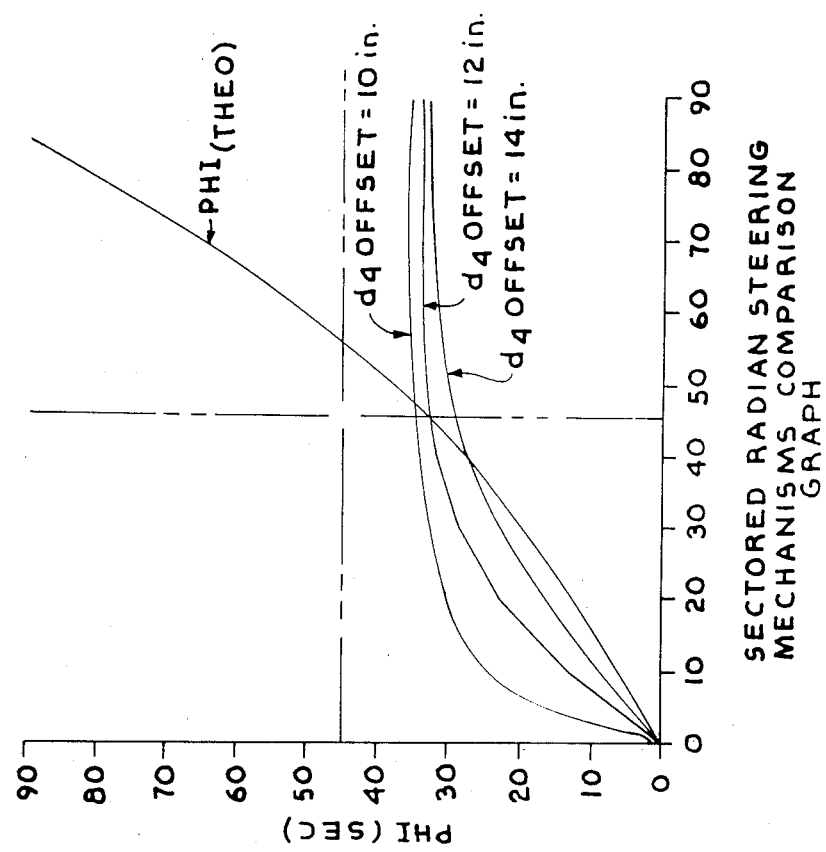
FIG. 14 shows plots of $Phi_{(sec)}$ generated by the radian sectored steering mechanism of the present invention in a fixed steerable axle with each plot $Phi_{(sec)}$ illustrating the effect on the responsive behavior of $Phi_{(sec)}$ of varying a pivot point of the sector arm on an upper fifth wheel plate.

The sectored sleeve assembly 106 comprises a sector box 140 having an upper horizontal surface 141, a lower horizontal surface 142, a sleeve opening 144, a lower sector rotation pin 146, a lower receiver 147, an upper sector rotation pin 149 and an upper sector receiver 150. The sleeve opening 144 is centrally positioned in a forward vertical face 152 of the sector box 140 and extends horizontally through the sector box 140 to a rear vertical face 153 of the sector box 140. The sleeve opening 144 is cylindrical in shape and of such a diameter to slidably receive the sector shaft 104. It is foreseen that the sector shaft 104 and the sleeve opening 144 size may vary according to the needs of the trailer design. The sleeve opening 144 is provided with wear bushings 155 which provide a bearing and wear surface between the sector box 140 and the sector shaft 104. The sector box 140 is also provided with conventional lubrication zerks 156 to lubricate the bearing surfaces. Fixedly attached to and extending downwardly from the lower horizontal surface 142 is a lower sector rotation pin 146 which is cylindrical in shape and has a bearing engagement with the lower receiver 150. The lower receiver 150 is centrally positioned on a cross-member 157 which spans the distance between and is fixedly attached to the I-beam members of the gooseneck portion 74 of the frame 67, as shown in FIG. 14. Fixedly attached to the upper horizontal surface 141 of the sector box 140 and extending in a vertical direction is the upper sector rotation pin 149. The upper sector rotation pin 149 has a bearing engagement with the upper sector receiver 150. The upper sector receiver 150 is mounted to an upper cross member 159 which is attached to and spans the distance between the frame members of the gooseneck portion 74 of the frame 67.

The rack-and-pinion 108 is of conventional design and comprises a pinion gear 165 which is mounted on the upper sector rotation pin 149 through an opening in its center. The pinion gear 165 has gear engagement with a first rack element 166 and a second rack element 167. The pinion gear 165 is attached by conventional bolting means to the upper horizontal surface 141 of the sector box 140, as shown in FIG. 12. The first rack element 166 and the second rack element 167 have bearing engagement with a first rack slide 169 and a second rack slide 170. The rack slide 169 the rack slide 170 are mounted on a first vertical support member 174 and a second vertical support member 175, respectively. The slide 169 and slide 170 are designed to slidably receive first rack element 166 and second rack element 167, respectively. The aft end of the first rack element 166 and the second rack element 167 are pivotally attached to a first hydraulic cylinder 177 and a second hydraulic cylinder 178, respectively, both of which are of conventional design with hydraulic inlet and outlet lines. The first hydraulic cylinder 177 and the second hydraulic cylinder 178 are pivotally attached to frame cross members 180 and 181.

Referring to FIG. 9, a fixed non-steerable axle assembly 62 is positioned some distance, $d_2$, from the center $C_4$ of the upper fifth wheel plate 81. The fixed non-steerable axle 62 is attached to the lower side of the trailer frame 67 by conventional means. It is foreseen that the location of the fixed non-steerable axle assembly 62 on the trailer frame 67 may vary according to the particular needs of the trailer. Further, it is foreseen that more than one fixed non-steerable axle assembly may be positioned in tandem on a trailer frame 67. For trailers with two tandem fixed axles, the distance $d_2$ is assumed to extend from the kingpin 83 to a mid point between the two fixed axles. The fixed non-steerable axle assembly 62 is of conventional design with dual wheels at each outboard end of the axle.

The fixed steerable axle assembly 58 comprises a fixed axle 184 fixedly attached by conventional means to the lower surface of the frame 167. The fixed steerable axle assembly 58 is positioned on a trailer frame 67 at a distance $d_1$ forward of the fixed axle 62. It is foreseen that the position of the fixed steerable axle assembly 58 may be positioned at a distance $d_1'$ greater than $d_1$ from the fixed non-steerable axle 62 or at a distance $d_1''$ aft of fixed axle 62. At each outboard end of the fixed axle 184 are wheel kingpin receivers 185 mounted to the fixed axles 184. Wheel kingpins 186 pivot in the kingpin receivers 185 to allow the wheels to be turned relative to the fixed axle 184. The wheel kingpins 186 are oriented perpendicular to the axle 184. A tie rod 188 is coupled to steering arms 189 by ball joints 190.

The steering actuation linkage assembly 60 comprises a steering rod 193 coupled at a first end to a steering arm extension 194 and at a second end to a bell crank first arm 198. The bell crank first arm 198 is fixedly attached to and is in right angle orientation with a bell crank second arm 215. The bell crank first arm 198 and bell crank second arm 215 comprise a bell crank 217 which is pivotally attached to a cross member 220 located between the longitudinal frame members of the frame 67. The bell crank second arm 215 is pivotally attached to a steering hydraulic actuator 223 which is fixedly attached to the frame 67. The bell crank second arm 215 is, at its outer end, pivotally attached to a steering equalizer rod 226. The steering equalizer rod 226 extends parallel to the longitudinal axis of the trailer 67 and is attached in a similar fashion to each steering actuation linkage assembly 60 associated with each fixed steerable axle assembly 58 positioned on the trailer frame 67 at other distances $d_1'$ and $d_1''$. The steering equalizer rod 226 ensures that each bell crank 217 associated with each steerable axle 53 is rotated an equal number of degrees by the hydraulic actuation system 54. Without such a steering equalizer rod 226, hydraulic fluid will seek the path of least resistance and introduce unpredictability into the resulting inclination generated in the various steerable axle assemblies 58 positioned on the trailer.

In operation, the locking dog 85 forces the upper fifth wheel plate 81 to rotate with a towing vehicle fifth wheel about the kingpin 83 center as an angle Theta develops. The lower ring member 77 rotates with the upper fifth wheel plate while the upper ring member 76 remains stationary with respect to the trailer frame 67. The relative rotational motion between the towing vehicle and the trailer frame 67 is transmitted to the fixed steerable axle assembly 58 by means of the sectored radian sine steering mechanism 45.

As the upper fifth wheel plate 81 rotates, it causes the yoke assembly 102 to rotate and, thus, causes the sectored shaft 104 to likewise rotate about the vertical axis of the rotation pin 149 and lower rotation 146. The sector shaft 104 is allowed to slide through the sleeve opening 144 of the sector box 140 to allow relative movement between the yoke assembly 102 and the sector box 140. As the yoke assembly 102 rotates, the sector shaft 104 is allowed to pivot about the pivot pin 131. Rotation of the sector box 140 is transmitted to rotation of the pinion gear 165 about the upper sector rotation pin 149 longitudinal axis. Because the pinion gear 165 has gear engagement with the first rack element 166 and second rack element 167, the rotational motion of the upper fifth wheel plate 81 is transmitted to linear motion in the first rack element 166 and second rack element 167, which in turn activates the first hydraulic cylinder 177 and second hydraulic cylinders 178. The linear motion of the rack-and-pinion steering assembly 52 is thus transformed into a hydraulic signal to the steering actuation linkage assembly 60 where it is reconverted to linear motion by a second hydraulic cylinder 223 Linear motion of the cylinders 177 is transmitted to rotational motion about the wheel kingpins 186 by rotation of the bell crank about its pivot point. Such rotation causes linear movement in the steering rod 193 and in its steering arm extension 194 which is ultimately transmitted to steering arm 189. The rotational motion of the wheel about the kingpin 186 adjacent the steering arm 189 is transmitted to the opposite corresponding kingpin 186 by the tie rod 188.

For a given hydraulic signal, the response in a fixed steerable axle assembly 58 can be varied by varying a length, $d_7$, of the bell crank first arm 198 or a length, $d_8$, of the bell crank second arm 215. The overall response of the steering mechanism 45 to a given rotation in the upper fifth wheel plate 81 can be modified by adjusting an offset distance, $d_4$, between the adjustment assembly 100 and the yoke assembly 102.

By using such adjustment means, a maximum turning angle generated by the sectored radian steering mechanism 45 in any fixed steerable axle assembly 58 can be somewhat modified.

FIG. 14 shows the effect of varying the offset distance, $d_4$, of the adjustment assembly 100 on the responsive behavior of $Phi_{(sec)}$. The values of $Phi_{(sec)}$ over a range of Theta between 0 and 90 degrees for the various offsets is determined according to the following equations:

$$Phi_{(sec)} = Omega + \tan^{-1}\left[\frac{INT_{long}}{INT_{trans}}\right] - \frac{3.14}{2}$$

Omega = Intermediate Angle $$= \cos^{-1}\frac{[INT^2 + d_9^2 - \text{Stay Length}^2]}{2 \times INT \times \text{Steer length}}$$

Stay Length = $(d_8^2 + d_{11}^2 - d_9^2 + d_{10}^2)^{**\frac{1}{2}}$

BLAL = Length of first Bell crank arm 198, ($d_8$)

$INT_{trans}$ = Intermediate Transverse

= $d_{10} + d_8 *$ sin (Bell ang)

$INT_{long}$ = Intermediate Longitudinal

= $d_{11} + d_8$ cos (Bell ang)

INT = Intermediate Length

= $(INT_{trans}^2 - INT_{long}^2)^{**\frac{1}{2}}$ $CD_{trans}$ = Transverse Distance from the axle kingpin 186 to the bellcrank center of pivot, $d_{10}$ $CD_{long}$ = Longitudianl distance from the axle kingpin 186 to the bellcrank center of pivot, $d_{11}$ Steer length = length of steering arm 193 ($d_9$)

Actu 8 = length of second bell crank 215 ($d_7$)

$A_{Intermediate} = (d_7^2 + d_6^2)^{**\frac{1}{2}}$ $Rho = \cos^{-1}\frac{[d_7^2 + A_{intermediate}^2 - \text{Cylength}^2]}{2 \times d_7 \times A_{intermediate}}$ Bell Ang = Bell crank 215 angle $$= \frac{3.14}{2} - Rho - \tan^{-1}\left[\frac{d_7}{d_6}\right]$$

Cy Length = cylinder length for any given angle (CHI)

= $d_6 - R_3 * CHI$ (Radians)

For Non-Sectored Devices

-continued

*THETA = CHI*
For Sectored Mechanisms $$CHI = \tan^{-1}\left[\frac{d_5 \times \sin^{(theta)}}{d_4 - d_5}\right]$$

Where:

$d_1$ = distance from fixed non-steerable axle 62 to the first fixed steerable axle 58 ($d_1$ = 6 ft.)

$d_2$ = distance from fixed steerable axle 62 to center, $C_4$, of upper fifth wheel plate assembly 49 ($d_2$ = 26.5 ft.)

$d_3$ = transverse distance from longitudinal axis of frame 67 to center of wheel kingpin 186 ($d_3$ = 3 ft.)

$d_4$ = offset between center, $C_4$, of upper fifth wheel plate assembly 49 and center of pivot pin 131 of the yoke assembly 102 ($d_4$ = 10 in., 12 in., and 14 in. respectively for three plots of Phi$_{(sec)}$).

$d_5$ = distance from center of upper fifth wheel plate assembly 49 and center of pinion gear 165 ($d_5$ = 18 in.).

$R_3$ = radius of pinion gear 165 ($R_3$ = 4.5 in.)

Figure 11:
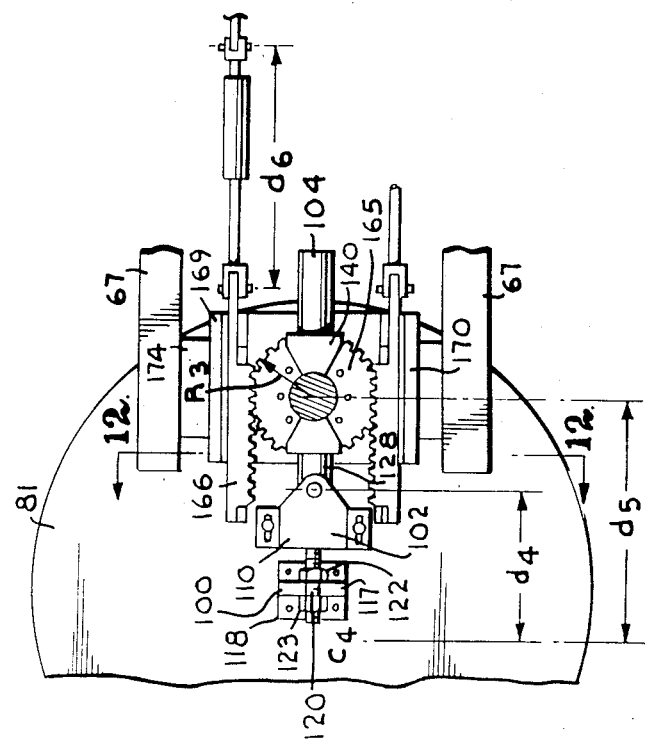
FIG. 11 is a fragmentary top plan and enlarged view of radian sectored steering mechanism shown in FIG. 10 but with the sector arm in a straight neutral position as it may be viewed when the trailer is not negotiating a turn.

$d_6$ = length of hydraulic cylinder 177 and 178 when the sectored radian steering mechanism 45 is in the neutral position as shown in FIG. 11 ($d_6$ = 25.25 in.)

$d_7$ = length of second bell crank second arm 215 ($d_7$ 7.75 in.)

$d_8$ = length of first bell crank arm 198 ($d_8$ = 11 in.)

$d_9$ = length of steering arm 189 ($d_9$ = 20 in.)

$d_{10}$ = transverse distance from wheel kingpin 186 to bell crank center of pivot ($d_{10}$ = 39.7 in.)

$d_{11}$ = longitudinal distance from wheel kingpin 186 center to bell crank 215 center of pivot ($d_{11}$ = 5 in.)

$d_{12}$ = length of steering rod 193 ($d_{12}$ = 39.9 in.)

Figure 10:
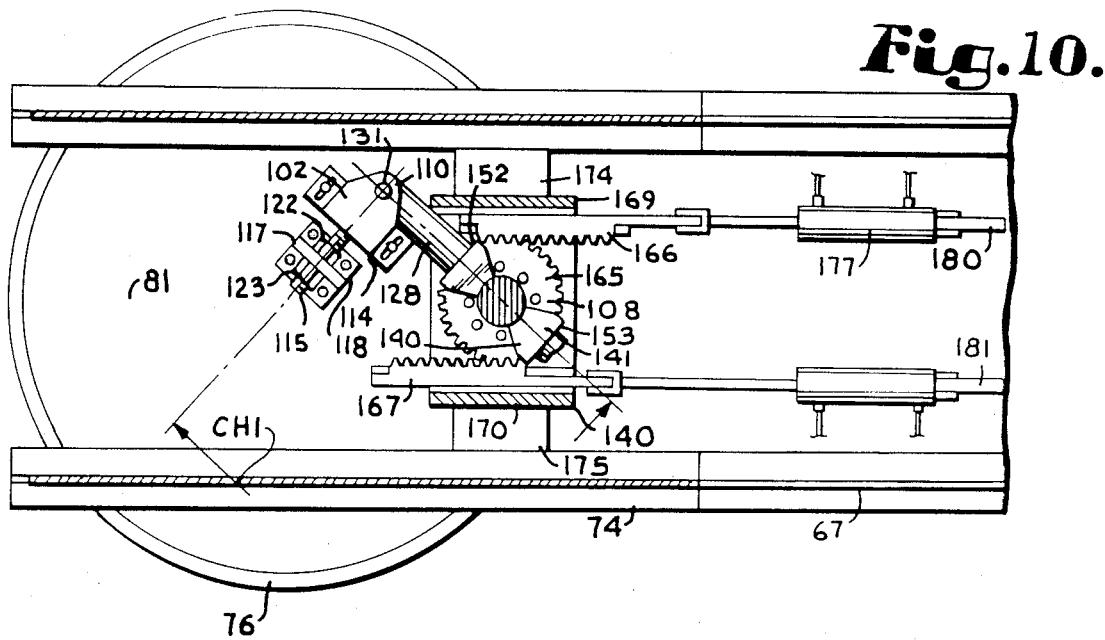
FIG. 10 is a fragmentary top plan view with a portion of a pair of rack slides cut away to show a rack-and-pinion portion of the sectored radian steering mechanism with a sector arm in a position as it may be viewed when the trailer is negotiating a turn.

Chi = angle between the longitudinal axes of the sector shaft 104 and a radius extending from center $C_4$ to the center of pivot pin 131 as shown in FIG. 10.

The values representing each of the three plots of Phi$_{(sec)}$ for offsets of 10 inches, 12 inches, and 14 inches corresponding to values of Theta between 0 and 90 degrees, shown in FIG. 14 are presented in Table 4 below.

TABLE 4

| THETA | CHI | PHI $_{(theo)}$ | PHI REAL (sec - 10 in. offset) | PHI (sec - 12 in. offset) | PHI (sec - 14 in. offset) |
|---|---|---|---|---|---|
| 0 | 0 | 0 | 0 | 0 | 0 |
| 5 | 6 | 1 | 2 | 3 | 5 |
| 10 | 12 | 2 | 4 | 6 | 10 |
| 15 | 17 | 4 | 6 | 8 | 13 |
| 20 | 22 | 5 | 7 | 10 | 14 |
| 25 | 26 | 6 | 8 | 12 | 16 |
| 30 | 29 | 8 | 9 | 13 | 16 |
| 35 | 32 | 10 | 10 | 13 | 17 |
| 40 | 34 | 12 | 11 | 14 | 17 |
| 45 | 36 | 14 | 11 | 14 | 17 |
| 50 | 37 | 17 | 12 | 15 | 17 |
| 55 | 38 | 21 | 12 | 15 | 17 |
| 60 | 39 | 26 | 12 | 15 | 17 |
| 65 | 39 | 33 | 13 | 15 | 17 |
| 70 | 40 | 42 | 13 | 15 | 17 |
| 75 | 40 | 56 | 13 | 15 | 17 |
| 80 | 41 | 74 | 13 | 15 | 17 |
| 85 | 41 | 96 | 13 | 15 | 17 |
| 90 | 41 | 17 | 113 | 15 | 16 |

Note that each plot of Phi$_{(sec)}$ as a function of Theta approaches an asymptote as Theta approaches 90 degrees. The slope of each plot of Phi$_{(sec)}$ tapers off and approaches the asymptote as Theta increases because of the slippage of the sector shaft 104 through a sector box 140 as the sector shaft 104 is rotated from its neutral position, as shown in FIG. 11, to its tangent position as shown in FIG. 10. In the tangent position shown in FIG. 10, the rotation of the upper fifth wheel plate 81 will not produce any appreciable rotation in the sector box 140 and thus, will not cause any appreciable rotation in the pinion gear 165. Instead, in this range of Theta, the rotational motion of the upper fifth wheel plate 81 is transformed into linear motion in the sector shaft 104 which slides through sleeve opening 144 of the sector box 140. As a result, the upper fifth wheel plate 81 and the towing vehicle are allowed to rotate through a range of Theta which does not create an output signal from the sectored radian steering mechanism 45. As such, the sectored radian steering mechanism 45 can be used with a fixed-steerable axle assemblies 58 for all angles of Theta near 90 degrees even through the fixed steerable axle 58 may have a physical limit on the extent of its inclination.

This advantage becomes more pronounced for fixed-steerable axles 58 further removed from the fixed non-steerable axles 62. FIG. 9 shows a fixed steerable axle 58 mounted on the trailer frame 67 at a distance, $d_1'$, greater than $d_1$.

Figure 15:
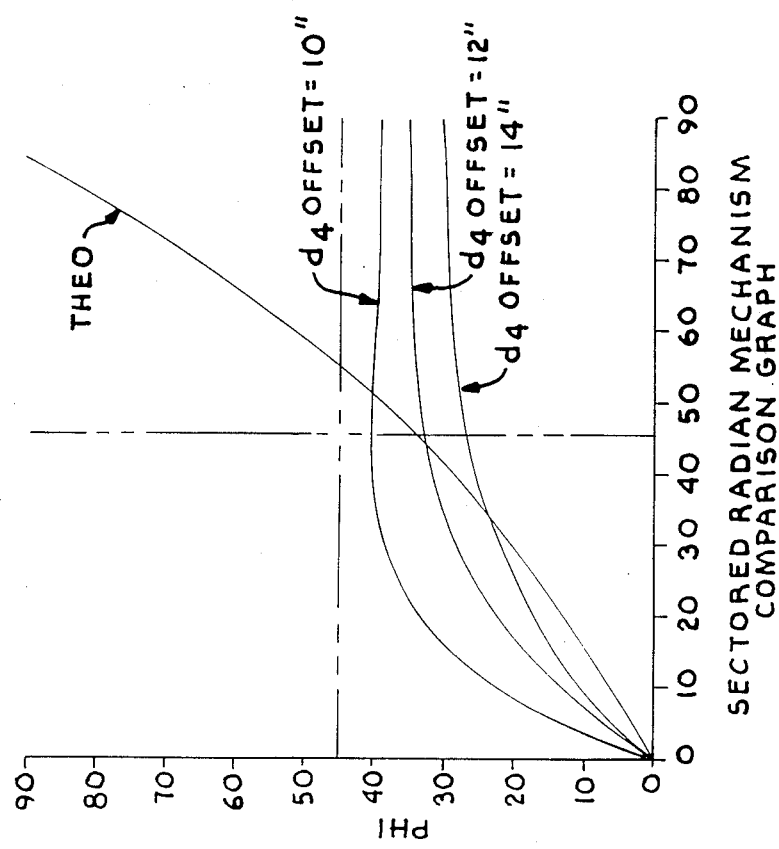
FIG. 15 shows how a theoretical angle, $Phi_{(theo)}$, and an angle generated by the sector radian steering mechanism $Phi_{(sec)}$ varies with a distance, $d_1$, from the fixed nonsteerable axle.

FIG. 15 shows how the plots of Phi$_{(sec)}$ change as the fixed-steerable axle 58 is positioned at a distance $d_1'$. $d_1$ ($d_1'$ = 15 ft.).

The values representing each of the three plots of Phi$_{(sec)}$ for offsets of 10 inches, 12 inches, and 14 inches corresponding to the values of Theta between 0 and 90 degrees, shown in FIG. 15, are presented in Table 5, (where $d_1$ = 15 ft.).

TABLE 5

| THETA | CHI | PHI$_{(theo)}$ | PHI (sec - 10 in. offset) | PHI (sec - 12 in. offset) | PHI (sec - 14 in. offset) |
|---|---|---|---|---|---|
| 0 | 0 | 0 | 0 | 0 | 0 |
| 5 | 6 | 3 | 4 | 7 | 12 |
| 10 | 12 | 6 | 8 | 13 | 21 |
| 15 | 17 | 9 | 12 | 18 | 28 |
| 20 | 22 | 12 | 16 | 23 | 33 |
| 25 | 26 | 16 | 18 | 26 | 36 |
| 30 | 29 | 19 | 21 | 29 | 38 |
| 35 | 32 | 23 | 23 | 30 | 39 |
| 40 | 34 | 28 | 24 | 32 | 40 |
| 45 | 36 | 33 | 26 | 33 | 40 |
| 50 | 37 | 38 | 27 | 33 | 40 |
| 60 | 39 | 51 | 28 | 34 | 40 |
| 65 | 39 | 58 | 28 | 34 | 40 |
| 70 | 40 | 66 | 29 | 34 | 40 |
| 75 | 40 | 75 | 29 | 34 | 39 |
| 80 | 41 | 84 | 29 | 34 | 39 |
| 85 | 41 | 93 | 30 | 34 | 38 |
| 90 | 41 | 101 | 30 | 34 | 38 |

As can be seen from a comparison of FIGS. 14 and 15, the advantage of the sectored radian steering mechanism 45 becomes more important for fixed steerable axles 58 positioned further away from the fixed non-steerable axles 72. For such axles 58, an output signal from a steering mechanism may attempt to generate higher angles of inclination which exceed the physical limitations imposed on the axle by the wheel kingpin design.

Figure 16:
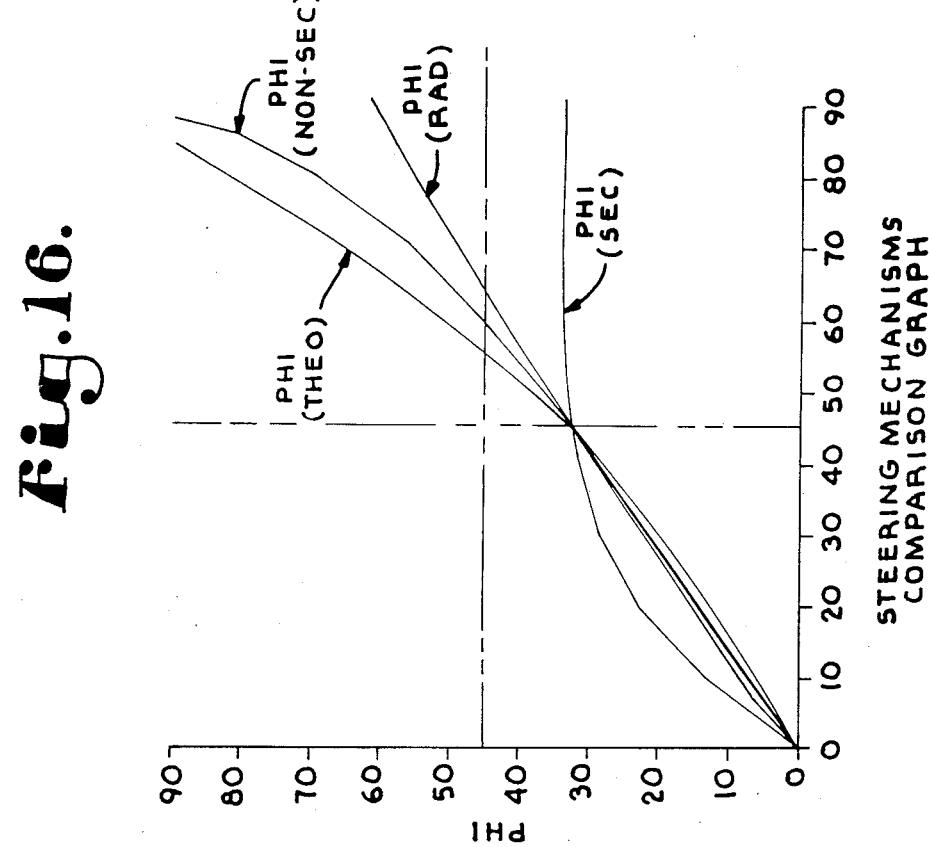
FIG. 16 shows a comparison between the plots of $Phi_{(sec)}$ and the plot representing a mechanical steering mechanism incorporating a non-sectored radian device, $Phi_{(non-sec)}$, $Phi_{(rad)}$ and $Phi_{(theo)}$.

FIG. 16 shows the plots of Phi$_{(theo)}$ and Phi$_{(sec)}$ for a fixed steerable axle 58 located 15 ft. from the fixed non-steerable axle 62 together with a plot Phi$_{(non-sec)}$ of the angles obtained by a radian steering mechanism 40, such as previously discussed, attached to the fixed steerable axle 58 through the hydraulic actuation system 54. In this example, the radian steering system 40 behaves as the sectored rack-and-pinion assembly 52 would if the central axis of the pinion gear was aligned with the central axis, $C_4$ of the upper fifth wheel plate and was fixedly attached thereto.

Table 6 presents the data corresponding to Theta, $Phi_{(rad)}$, and $Phi_{(sec)}$.

TABLE 6

| THETA | CHI | $PHI_{(rad)}$ | $Phi_{(theo)}$ | $Phi_{(sec)}$ |
|-------|-----|---------------|----------------|---------------|
| 0     | 0   | 0             | 0              | 0             |
| 5     | 5   | 3             | 3              | 1             |
| 10    | 10  | 7             | 6              | 1             |
| 15    | 15  | 10            | 9              | 2             |
| 20    | 20  | 14            | 12             | 2             |
| 25    | 25  | 18            | 16             | 2             |
| 30    | 30  | 21            | 19             | 2             |
| 35    | 35  | 25            | 23             | 2             |
| 40    | 40  | 29            | 28             | 1             |
| 45    | 45  | 33            | 33             | 0             |
| 50    | 50  | 37            | 38             | −1            |
| 55    | 55  | 42            | 44             | −2            |
| 60    | 60  | 47            | 51             | −4            |
| 65    | 65  | 52            | 58             | −6            |
| 70    | 70  | 58            | 66             | −8            |
| 75    | 75  | 66            | 75             | −9            |
| 80    | 80  | 78            | 84             | −6            |
| 85    | 85  | —             | 93             | —             |
| 90    | 90  | —             | 101            | —             |

As is evident from the plots in FIG. 16, the radian mechanism produces a $Phi_{(rad)}$ exceeding 45 degrees at a value of Theta of about 60 degrees. However, $Phi_{(sec)}$ approaches an asymptote at about 33 degrees and never exceeds 45 degrees over the entire range of Theta.

Referring to FIGS. 14 and 15, note that even though the values of $Phi_{(sec)}$ begin to deviate from the value of $Phi_{(theo)}$ at values of Theta exceeding 45 degrees, the adverse effects of such an error are overshadowed by the advantages of a steering mechanism output signal never generating angles of inclination in excess of 45 degrees in fixed steerable axles 58.

It is to be understood that while certain forms of the present invention have been illustrated and described herein, it is not to be limited to the specific forms or arrangement of parts described and shown.

What is claimed and desired to be secured by Letters Patent is as follows:

1. A sectored radian steering mechanism for a steerable trailer assembly on a towing vehicle having a fifth wheel, said trailer including an elongated main frame with a gooseneck portion, said gooseneck portion being pivotally connected to the fifth wheel; said fifth wheel being in load supporting relation to said gooseneck portion; said main frame being supported by at least one steerable fixed axle with pairs of ground engaging wheels pivotal about wheel kingpins, a steering arm associated with each axle for receiving a steering output signal from said sectored radian steering mechanism, and stay rods connected to and forcibly steering said pairs of wheels in unison, said steering mechanism including:
   (a) rotational motion detection means adapted to sense the relative rotation between the towing vehicle and the steerable trailer and generate a rotational output signal proportional to an angle between said towing vehicle and said steerable trailer; said rotational output signal approaching an asymptote as the angle between the towing vehicle and the steerable trailer approaches 90 degrees first and second members associated with said motion detection means; said first and second members adapted to rotate with the towing vehicle; said second member adjusting connected at a first end to said first member; a second end of said second member generating said rotational output signal; said asymptote being adjustable by varying a distance between said first and second members;
   (b) motion transformation means associated with said rotational motion detection means and adapted to transform said rotational output signal into a linear motion output signal;
   (c) linear motion transfer means associated with said motion transformation means and adapted to transmit linear motion output signal to said steerable axle; and
   (d) steering actuation linkage means connected to said linear motion transfer means and adapted to transform said linear motion output into rotational motion in each fixed steerable axle.

2. The apparatus of claim 1 wherein said steering actuation linkage means comprises:
   (a) a bell crank means for receiving said linear motion output from said linear motion transfer means; said bell crank means having a first arm, a second arm fixedly attached to said first arm and in angular relation thereto; said bell crank pivotally attached to a cross member in said trailer frame; wherein said linear motion output is transmitted to the first arm of said bell crank means causing said bell crank to rotate about its point of pivotal attachment to said frame; a tie rod with a first end and a second end, said tie rod pivotally linked to said second arm; wherein said rotation of said bell crank is transmitted to said tie rod at a first end; the tie rod second end pivotally linked to said steering arm; wherein linear motion output is transformed into rotational motion in said steering arm causing said steerable wheels to be inclined about said wheel kingpins fixedly attached to each end of said steerable axle.

3. A sectored radian steering mechanism for a steerable trailer assembly on a towing vehicle having a fifth wheel, said trailer including an elongated main frame with a gooseneck portion, said gooseneck portion being pivotally connected to the fifth wheel; said fifth wheel being in load supporting relation to said gooseneck portion; said main frame being supported by at least one steerable fixed axle with pairs of ground engaging wheels pivotal about wheel kingpins, a steering arm associated with each axle for receiving a steering output signal from said sectored radian steering mechanism, and stay rods connected to and forcibly steering said pairs of wheels in unison, said steering mechanism including:
   (a) rotational motion detection means adapted to sense the relative rotation between the towing vehicle and the steerable trailer and generate a rotational output signal proportional to an angle between said towing vehicle and said steerable trailer; said rotational output signal approaching an asymptote as the angle between the towing vehicle and the steerable trailer approaches 90 degrees; an upper ring of endless configuration fixedly attached to and disposed generally horizontally and centrally beneath a lower surface of the gooseneck portion of said trailer main frame; a lower ring slidably received in said upper ring; a roller bearing race disposed at a surface interface between said upper ring and said lower ring; a plurality of roller bearings disposed in said roller bearing race; an upper fifth wheel plate fixedly attached to a lower surface of said lower ring; a kingpin means extending downwardly from a lower surface of said upper fifth wheel plate for engaging the fifth wheel of said towing vehicle; said kingpin central axis aligning with the central axes of said upper and lower ring; a towing vehicle fifth wheel approach slot engagement means fixedly associated with a lower surface of said upper fifth wheel plate; said engagement means adapted to caused said upper fifth wheel plate to rotate with said fifth wheel of said towing vehicle during a turn.

(b) motion transformation means associated with said rotational motion detection means and adapted to transform said rotational output signal into a linear motion output signal;

(c) linear motion transfer means associated with said motion transformation means and adapted to transmit linear motion output signal to said steerable axle; and (d) steering actuation linkage means connected to said linear motion transfer means and adapted to transform said linear motion output into rotational motion in each fixed steerable axle.

4. A sectored radian steering mechanism for a steerable trailer assembly on a towing vehicle having a fifth wheel, said trailer including an elongated main frame with a gooseneck portion, said gooseneck portion being pivotally connected to the fifth wheel; said fifth wheel being in load supporting relation to said gooseneck portion; said main frame being supported by at least one steerable fixed axle with pairs of ground engaging wheels pivotal about wheel kingpins, a steering arm associated with each axle for receiving a steering output signal from said sectored radian steering mechanism, and stay rods connected to and forcibly steering said pairs of wheels in unison, said steering mechanism including;

(a) rotational motion detection means adapted to sense the relative rotation between the towing vehicle and the steerable trailer and generate a rotational output signal proportional to an angle between said towing vehicle and said steerable trailer; said rotational output signal approaching an asymptote as the angle between the towing vehicle and the steerable trailer approaches 90 degrees;

(b) motion transformation means associated with said rotational motion detection means and adapted to transform said rotational output signal into a linear motion output signal; said motion transformation means comprising a pinion gear means rotatably attached to and generally centered between said frame members of said gooseneck portion; wherein a central axis of said pinion gear means is generally vertical; a pinion gear drive means associated with said pinion gear means and said rotational motion detection means and adapted to transform said rotational output signal of said rotational motion detection means to rotational motion in said pinion gear means; rack gear means having gear tooth engagement with said pinion gear means, a rack gear slide means associated with said gooseneck portion for slidably receiving said rack gear means; said pinion gear drive means adapted to receive said rotational output signal of said rotational motion detection means and generate a proportional rotational motion in said pinion gear drive means; and said pinion gear means adapted to transform said rotational motion in said pinion gear means into said linear motion output signal (c) linear motion transfer means associated with said motion transformation means and adapted to transmit linear motion output signal to said steerable axle; and (d) steering actuation linkage means connected to said linear motion transfer means and adapted to transform said linear motion output into rotational motion in each fixed steerable axle.

5. A sectored radian steering mechanism for a steerable trailer assembly on a towing vehicle having a fifth wheel, said trailer including an elongated main frame with a gooseneck portion, said gooseneck portion being pivotally connected to the fifth wheel; said fifth wheel being in load supporting relation to said gooseneck portion; said main frame being supported by at least one steerable fixed axle with pairs of ground engaging wheels pivotal about wheel kingpins, a steering arm associated with each axle for receiving a steering output signal from said sectored radian steering mechanism, and stay rods connected to and forcibly steering said pairs of wheels in unison, said steering mechanism including:

(a) rotational motion detection means adapted to sense the relative rotation between the towing vehicle and the steerable trailer and generate a rotational output signal proportional to an angle between said towing vehicle and said steerable trailer; said rotational output signal approaching an asymptote as the angle between the towing vehicle and the steerable trailer approaches 90 degrees;

(b) motion transformation means associated with said rotational motion detection means and adapted to transform said rotational output signal into a linear motion output signal;

(c) linear motion transfer means associated with said motion transformation means and adapted to transmit linear motion output signal to said steerable axle; said linear motion transfer means comprising a conventional hydraulic actuation means; said hydraulic actuation means including at least one forward hydraulic cylinder which is capable of transforming said linear output of said linear motion transfer means into a hydraulic signal which is received by at least one rear hydraulic cylinder capable of transforming said hydraulic signal into a linear motion output;

(d) steering actuation linkage means connected to said linear motion transfer means and adapted to transform said linear motion output into rotational motion in each fixed steerable axle.

6. A sectored radian steering mechanism for a steerable trailer assembly on a towing vehicle having a fifth wheel, said trailer including an elongated main frame with a gooseneck portion, said gooseneck portion being pivotally connected to the fifth wheel; said fifth wheel being in load supporting relation to said gooseneck portion; said main frame being supported by at least one steerable fixed axle with pairs of ground engaging wheels pivotal about wheel kingpins, a steering arm associated with each axle for receiving a steering signal from said sectored radian steering mechanism, and stay rods connected to and forcibly steering said pairs of wheels in unison, said steering mechanism including:

(a) a rotational motion detection means adapted to sense the relative rotation between the towing vehicle and the steerable trailer and generate a rotational output signal; said rotational motion detection means comprising: an upper ring fixedly attached to and centered beneath a lower surface of the gooseneck portion of said trailer main frame; a lower ring slidably received in said upper ring; a roller bearing race provided at a surface interface between said upper ring and said lower ring; a plurality of roller bearings provided in said roller bearing race; an upper fifth wheel plate fixedly attached to a lower surface of said lower ring; a kingpin means extending downwardly from a lower surface of said upper fifth wheel plate for engaging the fifth wheel of said towing vehicle; said kingpin central axis aligning with the central axes of said upper and lower ring; said kingpin provided to transmit motion from the towing vehicle to the steerable trailer; a towing vehicle fifth wheel approach slot engagement means fixedly attached to a lower surface of said upper fifth wheel plate for releasably locking upper fifth wheel plate to said towing fifth wheel; and said engagement means for causing said upper fifth wheel plate to rotate with said fifth wheel of said towing vehicle during a turn;

(b) a motion transformation means associated with said rotational motion detection means and adapted to transform said rotational output signal into linear motion output signal; said motion transformation means comprising a rack-and-pinion apparatus; said rack-and-pinion apparatus including a pinion gear means rotatably attached to and generally centered between said frame members of said gooseneck portion of said frame; wherein a central axis of said pinion gear means is generally vertical; a pinion gear drive means which transforms the rotational output signal of the rotational motion detection means to rotational motion in the pinion gear means; rack gear means having gear tooth engagement with said pinion gear means, a rack gear slide means fixedly attached to said gooseneck portion of said trailer for slidably receiving said rack gear means; wherein the rotational output signal of said rotational motion detection means generates rotational motion in said pinion gear drive means, and wherein said rotational motion in said pinion gear drive means is transformed into said linear motion output in said rack gear means; a pinion gear sector box fixedly attached to a bottom surface of said pinion gear means; said sector box comprising a generally cube-shaped body having a front face, a rear face, an upper surface., a lower surface, a pair of side faces and a sleeve opening extending from the front face to the rear face, an upper pinion gear kingpin extending from and centered on said upper surface, a lower sector box kingpin extending from and centered on said lower surface; said sector box kingpin having a bearing engagement in a bearing housing fixedly attached to said gooseneck frame; said pinion gear kingpin extending from said upper surface of said sector box having a sliding engagement with an opening centrally positioned in said pinion gear means with an upper end of said pinion gear kingpin having a bearing engagement with a bearing housing fixedly attached gooseneck frame; a sector shaft having a first end pivotally and eccentrically mounted to said upper fifth wheel plate, a second end slidably received in said sleeve opening in said sector box; whereby said rotational output signal of said rotational motion detection means is transmitted to rotational motion of said sector arm causing rotation of said sector box and pinion gear means, causing linear motion output in said rack gear means;

(c) a linear motion transfer means associated with said motion transformation means and adapted to transmit said linear motion output signal to said steerable axle; said linear transfer motion means comprising: at least one hydraulic cylinder which is capable of transforming said linear output signal of said linear motion transfer means into a hydraulic signal which is received by at least one rear hydraulic cylinder capable of transforming said hydraulic signal into a linear motion output signal;

(d) a steering actuation linkage means connected to said linear motion transfer means and adapted to transform said linear motion output signal into rotational motion in each said fixed steerable axle for forcibly steering wheels pivotally connected to said fixed steerable axles in response to said relative motion between the towing vehicle and the steerable trailer; said steering actuation linkage means comprising: a bell crank means for receiving said linear motion output from said linear motion transfer means; said bell crank means having a first arm, a second arm fixedly attached to said first arm and in angular relation thereto; said bell crank pivotally attached to a cross member in said trailer frame; wherein said linear motion output is transmitted to the first arm of said bell crank means causing said bell crank to rotate about its point of pivotal attachment to said frame; a tie rod with a first end and a second end, said tie rod pivotally linked to said second arm; wherein said rotation of said bell crank is transmitted to said tie rod at a first end; the tie rod second end pivotally linked to said steering arm; wherein linear motion output is transformed into rotational motion in said steering arm causing said steerable wheels to be inclined about said wheel kingpins fixedly attached to each end of said steerable axle.

7. A sectored radian steering mechanism for a steerable trailer assembly on a towing vehicle having a fifth wheel, said trailer including an elongated main frame with a gooseneck portion, said gooseneck portion being pivotally connected to the fifth wheel; said fifth wheel being in load supporting relation to said gooseneck portion; said main frame being supported by at least one steerable fixed axle with pairs of ground engaging wheels pivotal about wheel kingpins, a steering arm associated with each axle for receiving a steering output signal from said sectored radian steering mechanism, and stay rods connected to and forcibly steering said pairs of wheels in unison, said steering mechanism including:

(a) rotational motion detection means adapted to sense the relative rotation between the towing vehicle and the steerable trailer, generate a rotational output signal proportional to an angle between said towing vehicle and said steerable trailer, and generate an angle of inclination in each said fixed steerable axle; said rotational output signal approaching an asymptote as the angle between the towing vehicle and the steerable trailer approaches 90 degrees; and (b) first and second members associated with said motion detection means; said first and second members adapted to rotate with the towing vehicle; said second member adjustably connected at a first end to said first member; a second end of said second member generating said rotational output signal; said asymptote being adjustable by varying a distance between said first and second members.

8. A sectored radian steering mechanism for a steerable trailer assembly on a towing vehicle having a fifth wheel, said trailer including an elongated main frame with a gooseneck portion, said gooseneck portion being pivotally connected to the fifth wheel; said fifth wheel being in load supporting relation to said gooseneck portion; said main frame being supported by at least one steerable fixed axle with pairs of ground engaging wheels pivotal about wheel kingpins, a steering arm associated with each axle for receiving a steering output signal from said sectored radian steering mechanism, and stay rods connected to and forcibly steering said pairs of wheels in unison, said steering mechanism including:

(a) rotational motion detection means adapted to sense the relative rotation between the towing vehicle and the steerable trailer and generate a rotational output signal proportional to an angle between said towing vehicle and said steerable trailer; said rotational output signal approaching an asymptote as the angle between the towing vehicle and the steerable trailer approaches 90 degrees;

(b) motion transformation means associated with said rotational motion detection means and adapted to transform said rotational output signal into a linear motion output signal and generate an angle of inclination in each said fixed steerable axle; said motion transformation means comprising: a pinion gear means rotatably attached to and generally centered between said frame members of said gooseneck portion; wherein a central axis of said pinion gear means is generally vertical; a pinion gear drive means associated with said pinion gear means and said rotational motion detection means and adapted to transform said rotational output signal of said rotational motion detection means to rotational motion in said pinion gear means; rack gear means having gear tooth engagement with said pinion gear means, a rack gear slide means associated with said gooseneck portion for slidably receiving said rack gear means; and said pinion gear drive means adapted to receive said rotational output signal of said rotational motion detection means and generate a proportional rotational motion in said pinion gear drive means; and said pinion gear means adapted to transform said rotational motion in said pinion gear means into said linear motion output signal.

9. A method for forcibly steering a steerable trailer having fixed steerable axles comprising:

(a) positioning a rotational motion detection means on a steerable trailer;

(b) sensing the relative angle between a towing vehicle and said steerable trailer with said rotational motion detection means;

(c) generating a rotational output signal proportional to said sensed angle between said towing vehicle and said steerable trailer;

(d) causing said rotational output signal to approach an asymptote as said sensed angle between said towing vehicle and said steerable trailer approaches 90 degrees;

(e) adjusting said asymptote when desired by varying a distance between a first and second member; said first and second members associated with said motion detection means; said first and second members adapted to rotate with the towing vehicle; said second member adjustably connected at a first end to said first member; a second end of said second member generating said rotational output signal; said asymptote being adjustable by varying a distance between said first and second members;

(f) transforming said rotational output signal into a linear motion signal with a rack-and-pinion means and;

(g) steering said fixed steerable axles with said linear motion signal.

* * * * *